(12) United States Patent
Sugawara et al.

(10) Patent No.: US 8,879,512 B2
(45) Date of Patent: Nov. 4, 2014

(54) MOBILE STATION DEVICE, BASE STATION DEVICE, COMMUNICATION SYSTEM, COMMUNICATION METHOD, AND PROGRAM

(75) Inventors: Yasuo Sugawara, Osaka (JP); Shohei Yamada, Osaka (JP); Yasuyuki Kato, Osaka (JP); Daiichiro Nakashima, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 777 days.

(21) Appl. No.: 12/672,210

(22) PCT Filed: Aug. 8, 2008

(86) PCT No.: PCT/JP2008/064338
§ 371 (c)(1),
(2), (4) Date: Feb. 4, 2010

(87) PCT Pub. No.: WO2009/020213
PCT Pub. Date: Feb. 12, 2009

(65) Prior Publication Data
US 2011/0237265 A1    Sep. 29, 2011

(30) Foreign Application Priority Data
Aug. 9, 2007   (JP) .................................. 2007-207955

(51) Int. Cl.
*H04B 7/216* (2006.01)
(52) U.S. Cl.
USPC ............................ 370/335; 455/450; 714/748
(58) Field of Classification Search
None
See application file for complete search history.

(56) References Cited

U.S. PATENT DOCUMENTS

| 6,597,675 | B1 | 7/2003 | Esmailzadeh et al. |
| 2008/0310395 | A1* | 12/2008 | Kashima ...................... 370/350 |
| 2010/0085929 | A1 | 4/2010 | Harada et al. |
| 2010/0232335 | A1* | 9/2010 | Lee et al. ...................... 370/312 |
| 2011/0047429 | A1* | 2/2011 | Kashima et al. .............. 714/748 |

FOREIGN PATENT DOCUMENTS

| EP | 1 976 316 A1 | 10/2008 |
| JP | 2002-524990 A | 8/2002 |
| JP | 2007-28328 A | 2/2007 |
| JP | 2007-194749 A | 8/2007 |
| JP | 2008-244526 A | 10/2008 |
| WO | WO-00/14989 A1 | 3/2000 |

OTHER PUBLICATIONS

3GPP TSG RAN WG2 # 57bis, "Text proposal on random access procedures," NTT DoCoMo, Inc., Mar. 26-30, 2007, St. Julian's, Malta, Draft R2-071562, pp. 1-4.

(Continued)

*Primary Examiner* — Chi Pham
*Assistant Examiner* — Mohammad Adhami
(74) *Attorney, Agent, or Firm* — Birch, Stewart, Kolasch & Birch, LLP

(57) ABSTRACT

Provided is a mobile station device which can increase the success ratio and reduce a communication delay when transmitting a dedicated preamble from the mobile station device to a base station device by using a random access channel (RACH). The mobile station device performs random access to the base station device by using a dedicated preamble. The mobile station device transmits a first message by using the dedicated preamble and again transmits the first message using the dedicated preamble during a period (a random access response reception-uncertain period) when the base station device may transmit a second message as a response to the first message.

6 Claims, 22 Drawing Sheets

MESSAGE 1 RECEPTION PROCESS

(56) References Cited

OTHER PUBLICATIONS

R1-050850 "Physical Channel and Multiplexing in Evolved UTRA Uplink", 3GPP TSG RAN WG1 Meeting #42 London, UK, Aug. 29-Sep. 2, 2005, pp. 1-14.

3GPP TS(Technical Specification)36.300, V09.0(Mar. 2007), Evolved Universal Terrestrial Radio Access(E-UTRA) and Evolved Universal Terrestrial Radio Access Network(E-UTRAN), Overall description Stage 2.

3GPP TS 36.300 V8.10. (Jun. 2007), "3rd Generation Partnership Project . . . Evolved Universal Terrestrial Radio Access (E-UTRA) and Evolved Universal Terrestrial Radio Access Network (E-UTRAN); Overall description; Stage 2 (Release 8)", No. V8.1.0, pp. 1-106, Jun. 1, 2007.

Ericsson, "Initial Random Access and Identity Handling", TSG-RAN WG2 Meeting #51, Feb. 9, 2006, R2-060592.

Motorola, "Contention and Contention-Free Intra-LTE Handovers", 3GPP TSG-RAN WG2 #56bis, Jan. 12, 2007, R2-070214.

Ericsson, "On the Details of the Dedicated Preamble at Intra-LTE Handover" Aug. 20-24, 2007; 3GPP TSG-RAN WG2 #59; R2-073238; pp. 1-3.

Samsung, "Recap of Handover Procedure, Control Plane Aspects (with TP)" Aug. 20-24, 2007; 3GPP TSG-RAN2 Meeting #59; R2-073704; pp. 1-8.

\* cited by examiner

MESSAGE 0 PROCESS

MESSAGE 0 DETERMINATION CRITERIA

PROCESS UPON RECEIVING MESSAGE 0

MESSAGE 1 TRANSMISSION PROCESS
AFTER MESSAGE 0 RECEPTION.

MESSAGE 1 RECEPTION PROCESS

MESSAGE 2 TRANSMISSION PROCESS

US 8,879,512 B2

MOBILE STATION DEVICE, BASE STATION DEVICE, COMMUNICATION SYSTEM, COMMUNICATION METHOD, AND PROGRAM

TECHNICAL FIELD

The present invention relates to a mobile station device, a base station device, a communication system, a communication method, and a program.

Priority is claimed on Japanese Patent Application No. 2007-207955, filed Aug. 9, 2007, the content of which is incorporated herein by reference.

BACKGROUND ART

For cellular networks applicable to immobile and mobile communications, W-CDMA has been standardized as a third generation cellular mobile communication scheme by 3GPP (3rd Generation Partnership Project), and services thereof have been sequentially provided. Further, HSDPA (High Speed Downlink Packet Access), which is a faster communication scheme, has also been standardized, and services thereof are about to be provided. Moreover, evolved universal terrestrial radio access (hereinafter, "EUTRA") has been considered by 3GPP.

OFDM (Orthogonal Frequency Division Multiplexing) has been proposed as an EUTRA downlink. Additionally, DFT (Discrete Fourier Transform)-spread OFDM, which is a single-carrier communication scheme, has been proposed as an EUTRA uplink.

FIG. 21 schematically illustrates an EUTRA communication system. Wireless communication is performed among a base station BS and mobile stations MS1 to MS3. As shown in FIG. 21, an EUTRA downlink includes a downlink pilot channel, a downlink synchronization channel, a broadcast channel (BCH), a physical downlink shared channel, a physical downlink control channel (PDCCH), and a downlink shared channel (DL-SCH).

An EUTRA uplink includes an uplink pilot channel (UPiCH), a random access channel (RACH), an uplink shared channel (UL-SCH), and a physical uplink control channel (PUCCH). These are disclosed in, for example, Non-Patent Document 1.

FIG. 22 schematically illustrates, by hatched patterns, an example of random access channels (RACH), uplink shared channels (UL-SCH), and physical uplink control channels (PUCCH) being allocated to radio resources. Uplink pilot channels (UPiCH) are not shown.

Uplink pilot channels (UPiCH) are distributed and allocated in units of symbols or subcarriers within a region of an uplink shared channel (UL-SCH) or of a physical uplink control channel (PUCCH).

In FIG. 22, horizontal and vertical axes denote time and frequency, respectively. Each region included in the two-dimensional plane defined by time and frequency shown in FIG. 22 is a time-and-frequency region called a resource unit.

In the case of FIG. 22, each resource unit is defined by 1.25 MHz in the frequency direction and 1 ms (i.e., 1 TTI (Transmit Time Interval)) in the time direction. Thus, it is assumed in EUTRA that the minimum unit of RACH is one resource unit. Additionally, it is assumed that multiple random access channels (RACH) are included in 1 TTI, and that multiple mobile stations can simultaneously perform random access using different frequencies.

Hereinafter, a random access procedure (contention based random access procedure) is explained. A typical random access procedure is disclosed in, for example, Non-Patent Document 2.

FIG. 23 is a sequence chart schematically illustrating such a typical random access procedure. In a case of random access currently assumed in EUTRA, four massages are exchanged between a mobile station and a base station.

Firstly, the mobile station device transmits a random access preamble (message 1) using a random access channel (RACH).

Currently, it is assumed in EUTRA that the random access preamble includes a preamble ID that is a signal pattern indicative of information, and that the random access preamble ID is 6 bits of data. In other words, 2 to the 6th power (i.e., 64) preamble IDs are prepared. Additionally, it is assumed that a random ID is allocated to 5 bits of the 6 bits of the preamble ID, and random access reason, downlink pathloss/CQI (Channel Quality Indicator), or the like is allocated to the remaining 1 bit (see Non-Patent Document 2).

Upon receiving the random access preamble from the mobile station device, the base station device calculates a synchronization timing shift between the mobile station device and the base station device based on the random access preamble. Additionally, the base station device performs scheduling for transmitting an L2/L3 (Layer 2/Layer 3) message (message 3). Further, the base station device assigns C-RNTI (cell-radio network temporary identity) that is mobile-station identification information to a mobile station device requiring C-RNTI. Moreover, the base station device transmits a random access response including synchronization timing-shift information, scheduling information with respect to the message 3, the C-RNTI, and the preamble ID (message 2).

Then, the mobile station extracts the response from the base station which includes the transmitted preamble ID, retrieves scheduling information, and transmits an L2/L3 message using the scheduled radio resource (message 3).

Upon receiving the L2/L3 message from the mobile station, the base station transmits contention resolution to the mobile station to have the mobile station determine whether or not a contention among mobile stations is occurring (message 4).

One of problems of such a contention based random access procedure is that a contention of preambles occurs when different mobile stations transmit preambles by using the same random access channel (RACH) and by selecting the same preamble ID.

For this reason, a system for solving the problem on the random access contention has been considered. A random access procedure for solving the contention problem is called a non-contention based random access procedure in which the base station preliminarily assigns a preamble ID (which is called a dedicated preamble ID) to be transmitted by the mobile station. By using this system, a preamble contention among mobile station devices does not occur. Additionally, it is currently assumed that this system is used upon inter-cell handover or when uplink resynchronization is required for a mobile station to receive downlink data.

FIG. 24 is a sequence chart schematically illustrating a random access procedure (non-contention based random access procedure) using a dedicated preamble.

As shown in FIG. 24, firstly, the base station assigns a dedicated preamble ID to a mobile station, and transmits a message including the dedicated preamble (message 0).

Then, the mobile station performs random access using the dedicated preamble ID received by the dedicated preamble assignment (message 1).

Then, the base station receiving the dedicated preamble transmits, as a random access response (preamble response), a TA (Timing Advance) command (synchronization information) indicative of the synchronization timing shift to the mobile station (message 2).

[Non-Patent Document 1] R1-050850 "Physical Channel and Multiplexing in Evolved UTRA Uplink", 3GPP TSG RAN WG1 Meeting #42 London, UK, Aug. 29-Sep. 2, 2005

[Non-Patent Document 2] 3GPP TS (Technical Specification) 36.300, V0.9.0 (2007-03), Evolved Universal Terrestrial Radio Access (E-UTRA) and Evolved Universal Terrestrial Radio Access Network (E-UTRAN), Overall Description Stage 2

DISCLOSURE OF THE INVENTION

Problems to be Solved by the Invention

Even in the case of the non-contention based random access procedure using the dedicated preamble, when the mobile station transmits the dedicated preamble (message 1 shown in FIG. 24) specified by the base station, the base station cannot successfully detect the dedicated preamble in some cases according to radio conditions between the mobile station and the base station.

A problem to be solved is that the base station has to retry a preamble assignment after a predetermined time has passed if the base station fails to detect the dedicated preamble, thereby causing a completion of a series of random access procedures to be delayed.

Means for Solving the Problems

In the present invention, if it is possible to perform random access using dedicated preambles within a predetermined period (within random access response reception-uncertain period), random access channels (RACH) are transmitted within the predetermined period (within random access response reception-uncertain period).

(1) Mobile Station Device:

A mobile station device according to one aspect of the present invention performs random access to a base station device using a dedicated preamble. The mobile station device includes a radio unit that transmits a first message using a dedicated preamble and retransmits the first message using a dedicated preamble within a random access response reception-uncertain period that is a period in which a second message that is a response to the first message can be transmitted from the base station device.

(2) Mobile Station Device:

A mobile station device according to one aspect of the present invention includes: a radio unit that performs transmission and reception of a radio signal; a scheduler that performs scheduling of channels used for transmission performed by the radio unit; and a random access controller that controls communication using random access channels. The scheduler performs scheduling of the random access channels. The random access controller performs, based on the scheduling performed by the scheduler, control so as to transmit a first message using a dedicated preamble, and control so as to repeatedly transmit the first message within a random access response reception-uncertain period that is a period in which a second message that is a response to the first message can be transmitted from the base station device. The radio unit transmits the first message using the random access channels based on the control performed by the random access controller.

(3) Mobile Station Device (Initialization of Window Time 1):

The random access controller of the mobile station device according to the aspect of the present invention resets the random access response reception-uncertain period and performs control so as to successively transmit the first message if the second message fails to be detected in the random access response reception-uncertain period and if it is within a predetermined second setting time.

(4) Mobile Station Device:

In the mobile station device according to the aspect of the present invention, the radio unit preliminarily receives permission information message from the base station device. The permission information message includes information concerning resource positions of random access channels allocated to the mobile station device and information concerning the dedicated preamble assigned to the mobile station device. The scheduler performs scheduling of random access channels based on the information concerning the resource positions of the random access channels which is included in the permission information message. The random access controller performs control so as to transmit the first message using the information concerning the dedicated preamble which is included in the permission information message.

(5) Mobile Station Device:

The random access controller of the mobile station device according to the aspect of the present invention performs control so as to transmit the first message using the dedicated preamble differing for each of the resource positions of the random access channels scheduled by the scheduler.

(6) Mobile Station Device (Frequency Hopping):

When performing scheduling including specifying random access resource positions expressed by time-and-frequency positions, the scheduler of the mobile station device according to the aspect of the present invention selects, from candidates of the random access resource positions selectable, a frequency position differing from one selected at a previous time position as a random access resource position to be used.

(7) Base Station Device:

A base station device according to one aspect of the present invention includes: a radio unit that performs transmission and reception of a radio signal; a scheduler that performs scheduling of channels used for transmission and reception performed by the radio unit; and a random access managing unit that controls communication using random access channels. The scheduler performs scheduling of random access channels. The random access managing unit, based on the scheduling performed by the scheduler, performs control so as to receive a first message transmitted from a mobile station device using a dedicated preamble, control so as to successively receive the first message if the first message fails to be received as scheduled and if it is within a first setting time, and control so as to transmit a second message as a response if the first message is successfully received within the first setting time. The radio unit receives the first message and transmits the second message based on the control performed by the random access managing unit.

(8) Base Station Device (Initialization of Window Time 1):

The random access managing unit of the base station device according to the one aspect of the present invention resets the first setting time and performs control so as to successively receive the first message if the first message fails to be received within the first setting time and if it is within the second setting time.

(9) Base Station Device:

In the base station device according to the one aspect of the present invention, the scheduler allocates resource positions of the random access channels to the mobile station device. The random access managing unit includes information concerning the resource positions allocated by the scheduler to the mobile station device and information concerning the dedicated preamble into permission information message. The radio unit preliminarily transmits the permission information message.

(10) Base Station Device:

In the base station device according to the one aspect of the present invention, the scheduler performs scheduling including allocating random access resource positions expressed by time-and-frequency positions to the mobile station device. The random access managing unit sets, based on the scheduling performed by the scheduler, the first setting time so that the random access resource positions allocated to the mobile station device are included in the time direction.

(11) Base Station Device:

In the base station device according to the one aspect of the present invention, the random access managing unit sets the second setting time to be equal to or greater than the first setting time.

(12) Base Station Device:

In the base station device according to the one aspect of the present invention, the random access managing unit assigns the dedicated preamble differing for each of the random access resource positions allocated by the scheduler to the mobile station device, and includes information concerning the dedicated preamble assigned into the permission information message.

(13) Base Station Device (Frequency Hopping):

In the base station device according to the one aspect of the present invention, when performing scheduling including specifying random access resource positions expressed by time-and-frequency positions, the scheduler allocates, to the mobile station device, a frequency position differing from one selected at a previous time position as a random access resource position to be used.

(14) Base Station Device (Permission of Frequency Hopping to Mobile Station Device):

In the base station device according to the one aspect of the present invention, when performing scheduling including specifying random access resource positions expressed by time-and-frequency positions, the scheduler allocates, to the mobile station device, frequency positions at a time position as random access resource positions selectable, and the random access managing unit performs control so as to receive the first message at the time position and at least one of the random access resource positions allocated to the mobile station device.

(15) Base Station Device:

In the base station device according to the one aspect of the present invention, the random access managing unit performs control so as to transmit the second message as a response to the mobile station device if at least one of the first messages is successfully received after trying to perform reception at all scheduled times for receiving the first messages from the mobile station device within the first setting time.

(16) Base Station Device:

In the base station device according to the one aspect of the present invention, the random access managing unit performs, if the first message is successfully received from the mobile station device, control so as to transmit the second message as a response to the mobile station device without waiting for the next scheduled time for reception within the first setting time.

(17) Base Station Device (Dedicated Window Time 1):

In the base station device according to the one aspect of the present invention, the random access managing unit performs control so as to set the first setting time for each of the first messages and to transmit, if the first message is received, the second message within the first setting time corresponding to the first message received.

(18) Communication System:

A communication system according to one aspect of the present invention includes: any one of the mobile station devices described above; and the base station device described above. The mobile station device transmits the first message to the base station device. The base station device receiving the first message transmits the second message to the mobile station device.

(19) Communication Method:

A communication method according to one aspect of the present invention is a communication method for a communication system comprising a base station device and a mobile station device. The communication method includes: a first step of the base station device performing scheduling of random access channels; a second step of the mobile station device performing scheduling of random access channels correspondingly to the scheduling of random access channels performed by the base station device; a third step of the mobile station device transmitting a first message using a dedicated preamble assigned to the mobile station device based on the scheduling performed by the mobile station device; a fourth step of the mobile station device repeatedly transmitting the first message if the base station device fails to detect a second message that is a response to the first message and transmitted from the base station device; a fifth step of the base station device performing control so as to receive the first message from the mobile station device based on the scheduling; a sixth step of the base station device performing control so as to successively receive the first message even if the first message fails to be received as scheduled and if it is within a predetermined first setting time; and a seventh step of the base station device transmitting the second message to the mobile station device as a response if the first message is received within the first setting time.

(20) Program for Mobile Station Device:

A computer program according to one aspect of the present invention is a program having a computer included in a mobile station device performing transmission and reception of a signal execute: a scheduling process of scheduling channels used for transmission; and a random access control process of controlling communication using random access channels. The scheduling process includes a process of scheduling random access channels. The random access control process includes a process of performing control so as to transmit the first message using a dedicated preamble based on the scheduling in the scheduling process, and to repeatedly transmit the first message within a predetermined first setting time if a second message that is a response to the first message and transmitted from the base station device fails to be detected.

(21) Program for Base Station Device:

A computer program according to one aspect of the present invention is a program having a computer included in a base station device performing transmission and reception of a signal execute: a scheduling process of scheduling channels used for transmission and reception; and a random access managing process of controlling communication using random access channels. The random access managing process includes a process of performing control so as to receive, based on the scheduling performed by the scheduler, a first message transmitted from the mobile station device using a dedicated preamble, to successively receive the first message if the first message fails to be received as scheduled and if it is within a predetermined first setting time, and to transmit a second message that is a response to the first message to the mobile station device if the first message is received within the first setting time.

Effects of the Invention

The present invention has a merit in that a random access channel (RACH) is transmitted if a random access channel can be transmitted within a unit time (random access response reception-uncertain period) upon random access using a dedicated preamble, thereby enabling an increase in a RACH success possibility of the one-time non-contention based random access procedure.

Figure 1:
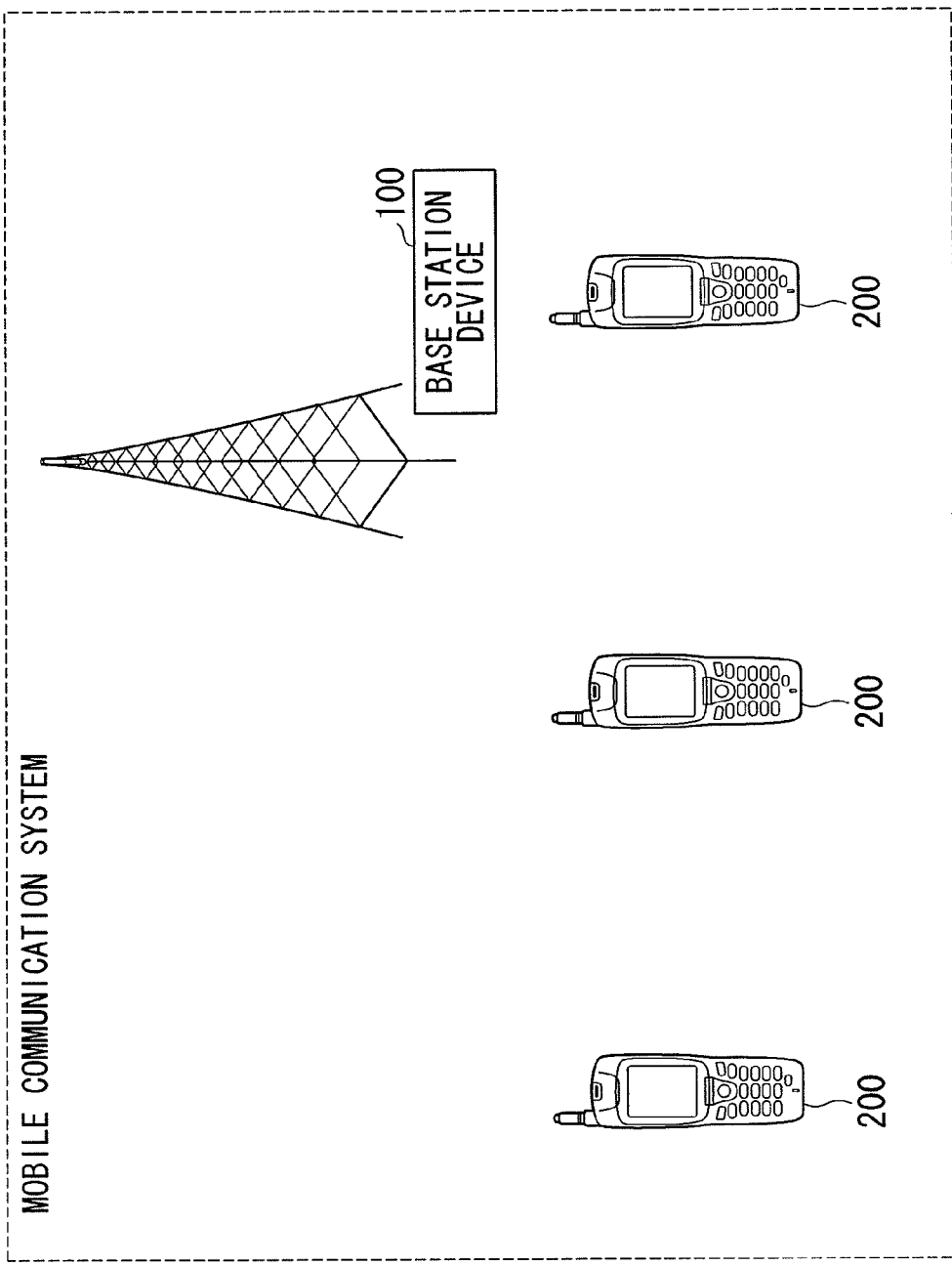
FIG. 1 schematically illustrates the entire configuration of a mobile communication system according to a first embodiment of the present invention.

DESCRIPTION OF REFERENCE NUMERALS 100 base station device
101 data controller
102 OFDM modulator
103 controller
104 radio unit
105 channel estimator
106 DFT-S-OFDM demodulator
107 control data extractor
108 scheduler
109 random access managing unit
200 mobile station device
201 data controller
202 DFT-S-OFDM modulator
203 controller
204 scheduler
205 random access controller
207 radio unit
208 channel estimator
209 OFDM demodulator
210 control data extractor

BEST MODE FOR CARRYING OUT THE INVENTION

Hereinafter, exemplary embodiments of the present invention are explained with reference to the accompanying drawings. In the embodiments, the present invention is applied to a communication system of EUTRA (Evolved Universal Terrestrial Radio Access), as an example.

First Embodiment

Configuration of Mobile Communication System

FIG. 1 schematically illustrates a configuration of a mobile communication system according to a first embodiment of the present invention. As shown in FIG. 1, the mobile communication system includes a base station device 100 and a mobile station device 200.

Although only one mobile station device may be present, multiple mobile station devices (three mobile station devices 200 in the case of FIG. 1) are usually present. Although only one base station device is illustrated, multiple base station devices 100 are present in the entire mobile communication system. In the mobile communication system, the mobile station devices (mobile stations) 200 are connected to the base station device (base station) 100. In other words, the base station device communicates with the mobile station devices using radio signals.

(Configuration of Base Station Device)

Figure 2:
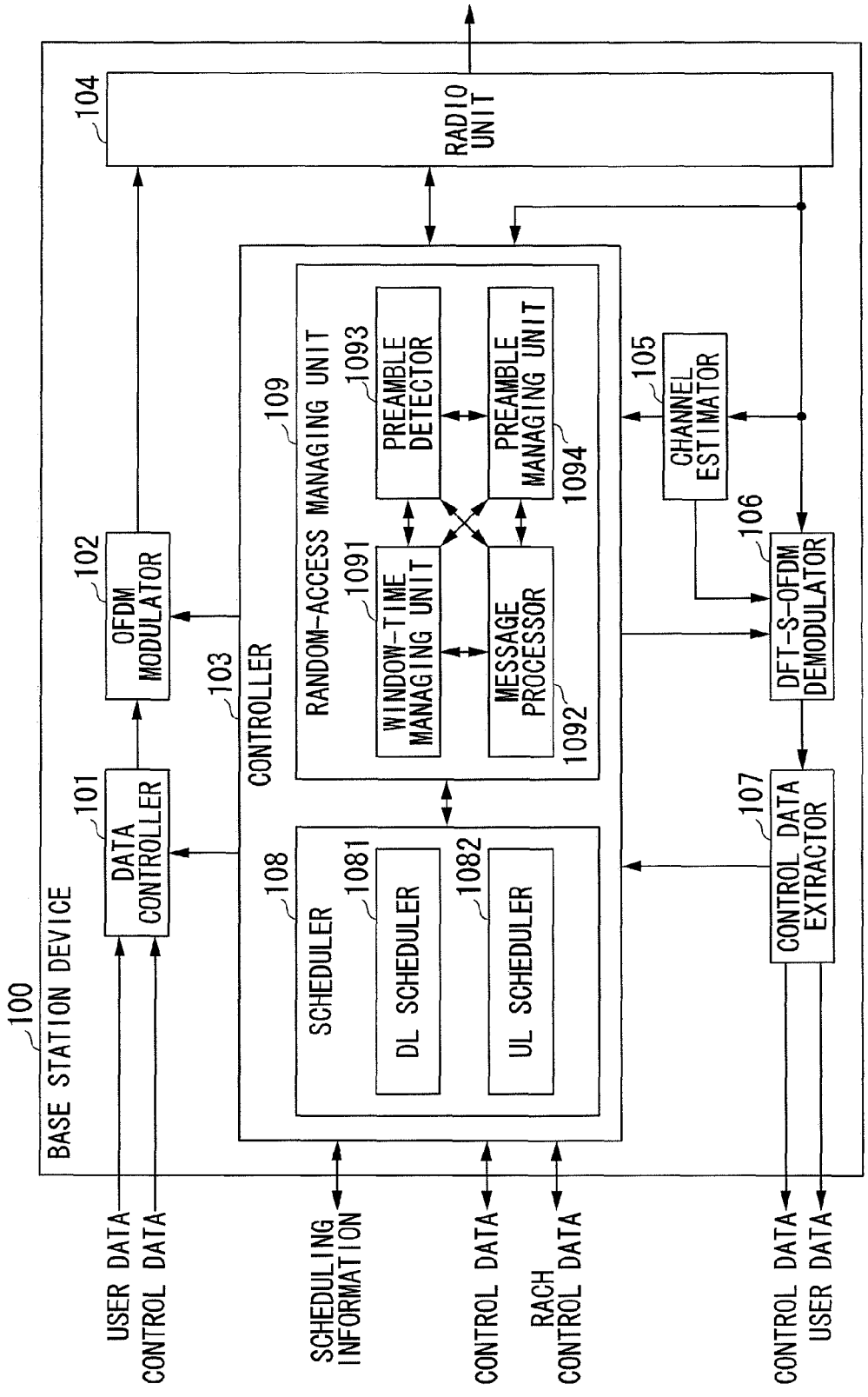
FIG. 2 is a block diagram illustrating a functional configuration of a base station device according to the first embodiment.

FIG. 2 is a block diagram illustrating a functional configuration of the base station device included in the communication system according to the first embodiment. In FIG. 2, a reference numeral 100 denotes the base station device. The base station device 100 includes a data controller 101, an OFDM modulator 102, a controller 103, a radio unit 104, a channel estimator 105, a DFT-Spread-OFDM demodulator (DFT-S-OFDM demodulator) 106, and a control data extractor 107.

The controller 103 includes a scheduler 108 and a random access managing unit 109, and controls the entire base station device 100 for the entire processing as will be explained later.

The random access managing unit 109 is a controller that performs random access control using a dedicated preamble, and includes a window-time managing unit 1091, a message processor 1092, a preamble detector 1093, and a preamble managing unit 1094.

The scheduler 108 includes: a DL scheduler 1081 that performs downlink scheduling; and an UL scheduler 1082 that performs uplink scheduling. In other words, the scheduler 108 performs channel scheduling for transmission and reception by the radio unit 104.

The data controller 101 receives control data and user data. Then, the data controller 101 maps, according to an instruction from the scheduler 108, the control data to the physical downlink control channel (PDCCH), the downlink synchronization channel, the downlink common control channel, the downlink pilot channel, the broadcast channel (BCH), and the downlink shared channel (DL-SCH). Additionally, the data controller 101 maps transmission data (user data) addressed to respective mobile stations to the downlink shared channel (DL-SCH). The control data mapped onto the physical downlink control channel (PDCCH) is called L1/L2 control signaling. The control data mapped onto the downlink shared channel (DL-SCH) is called L3 control signaling.

The OFDM modulator 102 receives the data mapped by the data controller 101 onto each channel, and performs OFDM signal processing, such as data modulation, serial-to-parallel conversion on an input signal, IFFT (Inverse Fast Fourier Transform), CP (Cyclic Prefix) insertion, and filtering, to generate OFDM signals.

The radio unit 104 upconverts the data modulated by the OFDM modulator 102 into a radio frequency signal, and transmits the radio signal to the mobile station device through an antenna (not shown).

Additionally, the radio unit 104 receives, through the antenna (not shown), a radio signal that is uplink data modulated by the mobile station, downconverts the received signal into a baseband signal, and outputs the reception data to the channel estimator 105 and the DFT-S-OFDM demodulator 106. Further, the radio unit 104 outputs a preamble (message 1) to the preamble detector 1093 upon receiving the preamble (message 1, first message).

The channel estimator 105 estimates radio channel characteristics based on the uplink pilot channel (UPiCH), and outputs the estimation result to the DFT-S-OFDM demodulator 106. Additionally, the channel estimator 105 outputs the radio channel estimation result to the UL scheduler 1082 for uplink scheduling. Although it is assumed that a single-carrier scheme, such as DFT-S-OFDM, is used as an uplink communication scheme, a multi-carrier scheme, such as OFDM, may be used.

The DFT-S-OFDM demodulator 106 demodulates the reception data received from the radio unit 104 according to the radio channel estimation result from the channel estimator 105, and outputs the demodulated data to the control data extractor 107.

The control data extractor 107 divides the data received from the DFT-S-OFDM demodulator 106 into user data and control data. The control data includes downlink CQI information informed by the mobile station, and other control data. Then, the control data extractor 107 outputs the downlink CQI information included in the divided control data to the DL scheduler 1081, and the other control data and the user data to an upper layer.

The DL scheduler 1081 performs scheduling for mapping the control data and the user data onto respective downlink channels based on the downlink CQI information informed by the mobile station device and data information concerning each user informed by the upper layer. Particularly, the DL scheduler 1081 performs scheduling of messages 0 and 2 for random access using a dedicated preamble.

The UL scheduler 1082 performs scheduling for mapping user data onto respective uplink channels based on information such as the uplink radio-channel estimation result from the channel estimator 105 and a resource allocation request from the mobile station device.

Particularly, upon random access using a dedicated preamble, the UL scheduler 1082 determines which random access channel (RACH) resource is to be allocated to the mobile station device while communicating with the random access managing unit 109 (scheduling of random access channels).

The window-time managing unit 1091 performs generation, management, and setting of a window time 1 (first setting time) and a window time 2 (second setting time) while communicating with the UL scheduler 1082. The window-time managing unit 1091 includes a timer. The window times 1 and 2 will be explained in detail later when a process flow is explained.

The message processor 1092 generates a message 0 (permission information message) and a message 2 (second message). The message processor 1092 generates random access permission information while communicating with the UL scheduler 1082. The message 0 is a message transmitted from the base station device to the mobile station device, and is a dedicated preamble assignment message for informing a dedicated preamble ID to be assigned to the mobile station device. The message 2 is a response message (preamble response) transmitted from the base station device to the mobile station device according to the preamble transmitted from the mobile station device to the base station device. The message processor 1092 includes, into the message 0, the window times 1 and 2 informed by the window-time managing unit 1091, a preamble ID (dedicated preamble set) informed by the preamble managing unit 1094, and random access permission information. Additionally, the message processor 1092 includes the synchronization timing-shift amount (synchronization information) informed by the upper layer into the message 2. The generated messages 0 and 2 are modulated by the OFDM modulator 102 through the data controller 101, and are informed to the mobile station through the radio unit 104.

The preamble detector 1093 detects a preamble (message 1) from the mobile station based on the preamble ID informed by the preamble managing unit 1094, and the information informed by the window-time managing unit 1091. When the assigned preamble ID is detected, the preamble detector 1093 calculates the synchronization timing-shift amount and reports the calculated synchronization timing-shift amount to the upper layer.

The preamble managing unit 1094 manages preamble IDs. The preamble managing unit 1094 selects a preamble based on an instruction from the upper layer while communicating with the UL scheduler 1082, and informs the upper layer, the preamble detector 1093, and the message processor 1092 of the selected preamble ID. The preamble managing unit 1094 confirms a currently-used preamble ID, and selects a preamble ID to be assigned from preamble IDs excluding the currently-used preamble ID. When the preamble managing unit 1094 assigns a preamble ID, the preamble managing unit 1094 stores the assigned preamble ID as a currently-used preamble ID, and deletes the assigned preamble ID from a list of assignable preamble IDs. In this case, the preamble managing unit 1094 selects a preamble to assign a dedicated preamble to the mobile station device.

(Configuration of Mobile Station Device)

Figure 3:
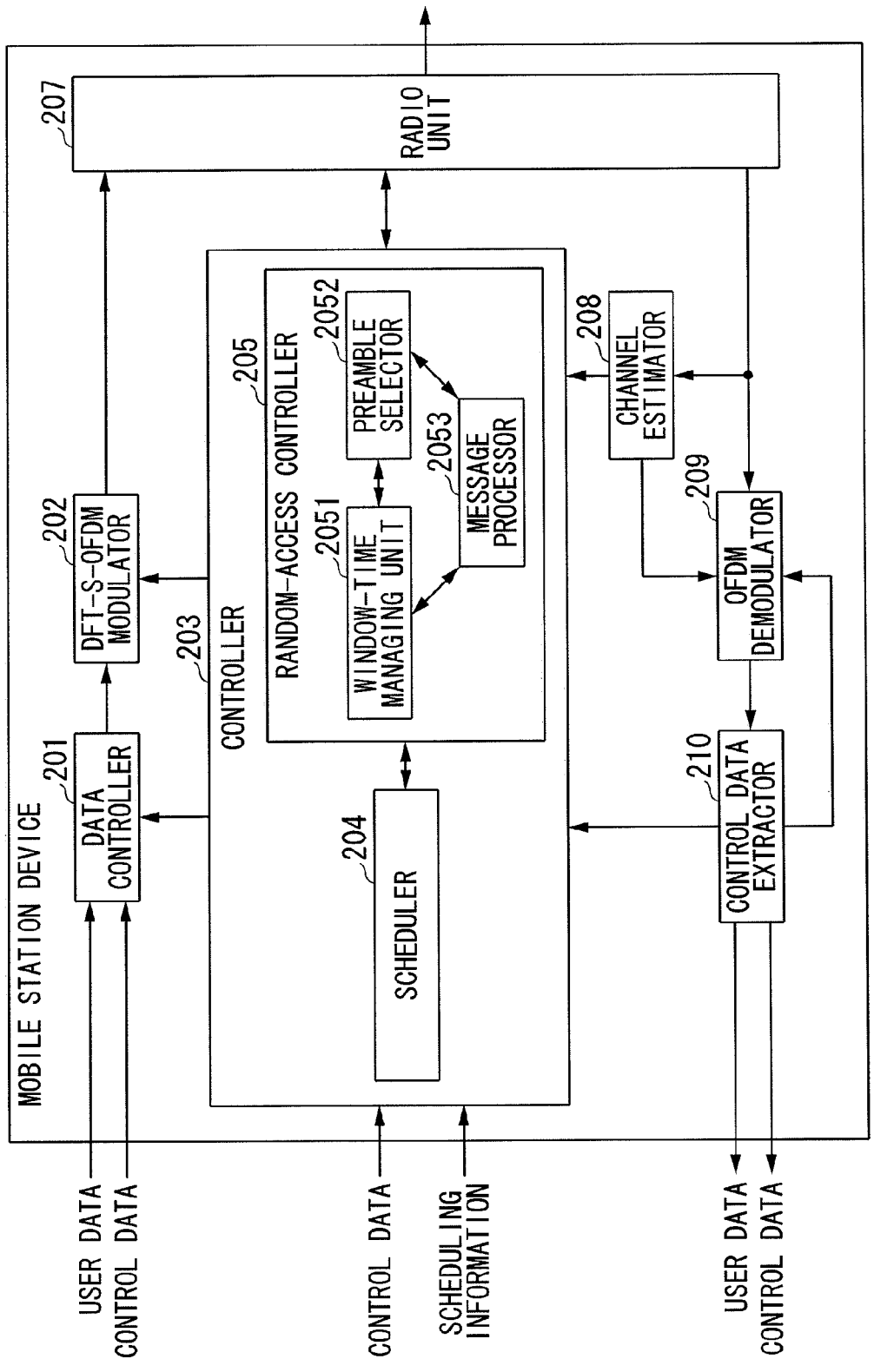
FIG. 3 is a block diagram illustrating a functional configuration of a mobile station device according to the first embodiment.

FIG. 3 is a block diagram illustrating a functional configuration of the mobile station device according to the first embodiment. As shown in FIG. 3, the mobile station device 200 includes a data controller 201, a DFT-S-OFDM modulator 202, a controller 203, a radio unit 207, a channel estimator 208, an OFDM demodulator 209, and a control data extractor 210.

The controller 203 includes a scheduler 204 and a random access controller 205, and controls the entire mobile station device with respect to the entire process of the mobile station device as will be explained later.

The data controller 201 receives user data and control data from the upper layer, and maps these data items onto respective uplink channels according to an instruction from the scheduler 204.

The DFT-S-OFDM modulator 202 performs data modulation, and DFT-S-OFDM signal processing, such as DFT (Discrete Fourier Transform), subcarrier mapping, IFFT (Inverse Fast Fourier Transform), CP (Cyclic Prefix) insertion, and filtering, to generate a DFT-Spread-OFDM signal. Although it is assumed that a single-carrier scheme, such as DFT-Spread-OFDM, is used as an uplink communication scheme, a multi-carrier scheme, such as OFDM, may be used.

The radio unit 207 upconverts the modulated data received from the DFT-S-OFDM modulator 202 into a radio frequency signal. Then, the radio unit 207 transmits the upconverted radio signal to the base station device 100 through an antenna (now shown). Additionally, the radio unit 207 receives, through the antenna (not shown), a radio signal that is downlink data modulated by the base station device 100. Then, the radio unit 207 downconverts the received signal into a baseband signal, and outputs the reception data to the channel estimator 208 and the OFDM demodulator 209.

The channel estimator 208 estimates the radio channel characteristics based on the signal on the downlink pilot channel, and outputs the estimation result to the OFDM demodulator 209. Additionally, the channel estimator 208 converts the estimation result into downlink CQI information to inform the base station device 100 of the radio channel estimation result. Then, the channel estimator 208 informs the scheduler 204 of the downlink CQI information.

The OFDM demodulator 209 demodulates the reception data received from the radio unit 207 based on the radio channel estimation result received from the channel estimator 208, and informs the control data extractor 210 of the demodulated reception data.

The control data extractor 210 divides the demodulated reception data into user data and control data. The control data includes the messages 0 or 2 from the base station device, the scheduling information, and other control data. The message 0 or 2 from the base station device which is included in the divided control data is output to the message processor 2053. The other control data (including scheduling information) and the user data are output to the upper layer.

The scheduler 204 performs scheduling for mapping the user data and the control data onto respective uplink channels (including a random access channel) based on the downlink CQI infoiniation indicated by the channel estimator 208 and the scheduling information indicated by the upper layer. The signal transmitted from the radio unit 207 is based on the scheduling by the scheduler 204.

The random access controller 205 is a controller that controls random access using a dedicated preamble, and includes a window-time managing unit 2051, a preamble selector 2052, and a message processor 2053. The random access controller 205 controls communication using random access channels as will be explained later.

The window-time managing unit 2051 performs setting of the window time 1 (first setting time) and the window time 2 (second setting time) which are indicated by the base station device 100. The window-time managing unit 2051 includes a timer.

The preamble selector 2052 selects a preamble ID added the message 0 received from the base station device 100, and outputs the selected preamble ID to the message processor 2053.

The message processor 2053 performs processing of the messages 0 and 2 indicated by the base station, and generates a message 1. Upon receiving the message 0 from the base station device, the message processor 2053 extracts the window time 2, the preamble ID (dedicated preamble set), and the random access permission information. Then, the message processor 2053 informs the preamble selector 2052 of the preamble ID (dedicated preamble set), and informs the window-time managing unit 2051 of the window time 2. Additionally, the message processor 2053 generates a preamble (message 1) using the preamble ID selected by the preamble selector 2052. The generated preamble is modulated by the DFT-S-OFDM modulator 202, and is transmitted to the base station through the radio unit 207. Further, the message processor 2053 performs monitoring for receiving the message 2 from the base station after transmitting the preamble (message 1).

(Processing Procedure of First Embodiment)

Two window times (window times 1 and 2) are used in the present embodiment. If the mobile station device does not receive the message 2 from the base station device within the window time 1 after firstly transmitting the message 1, and has an opportunity for transmitting the next random access channel (RACH), the mobile station device subsequently transmits the message 1.

According to the present embodiment, thanks to the use of two window times (window times 1 and 2), if the mobile station device fails to detect reception of the message 2 from the base station device within the window time 1 after firstly transmitting the message 1, and if it is within the window time 2, the mobile station device can initialize and reset the window time 1, and then subsequently transmit the message 1 without performing the non-contention based random access procedure again.

Hereinafter, communication between the base station device 1 and the mobile station device 3 explained above is specifically explained with reference to FIGS. 2 to 5.

In a processing procedure explained here, the base station device informs positions of random access channels (RACH) through the broadcast channel (BCH) or the downlink shared channel (DL-SCH). Additionally, the mobile station device receives information concerning the positions, and confirms accurate time-and-frequency positions of random access channels (RACH). The positions of random access channels (RACH) informed by the base station device to the mobile station device are information for specifying resources to which random access channels (RACH) are allocated in the two-dimensional space defined by time and frequency axes.

The random access channels (RACH) are present at the 5 ms interval in the present embodiment.

Figure 4:
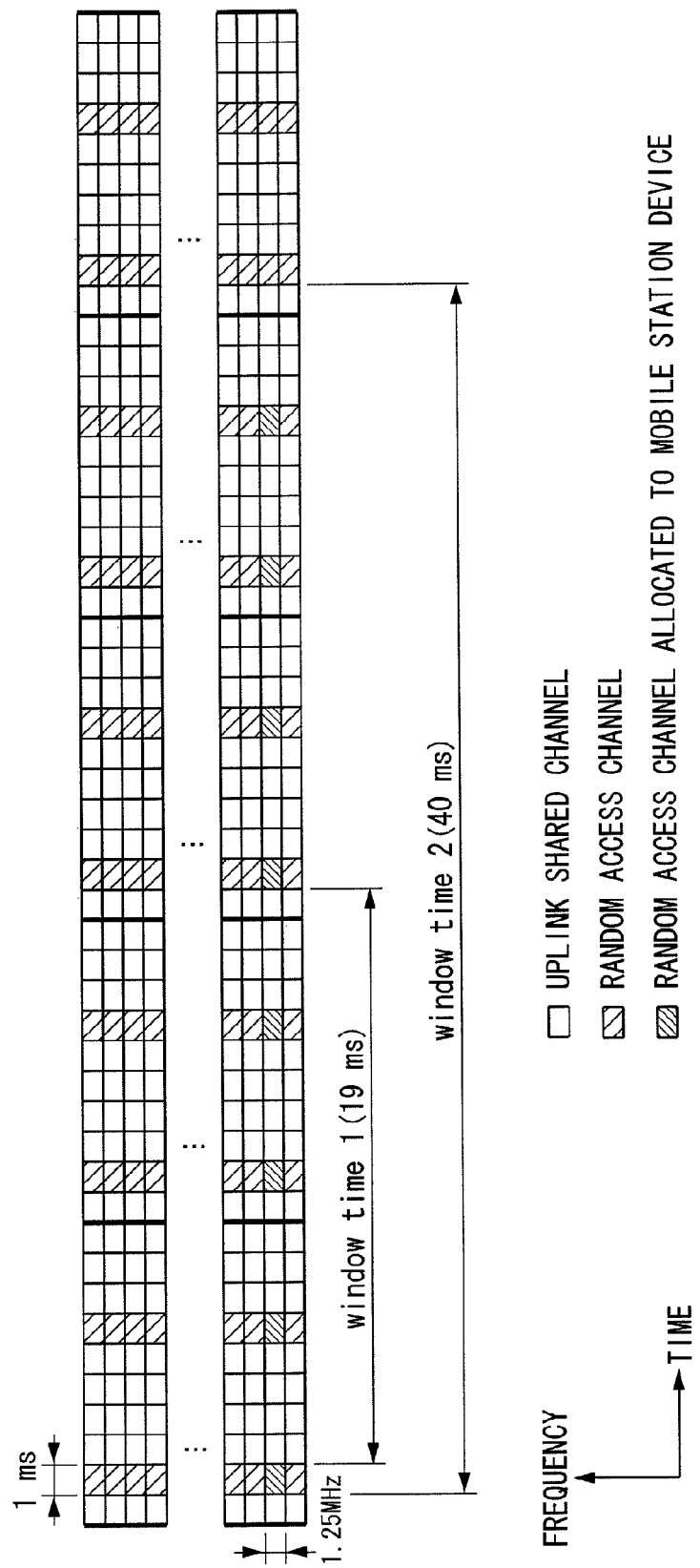
FIG. 4 schematically illustrates an allocation example of channels allocated by the base station device according to the first embodiment.

FIG. 4 schematically illustrates an allocation example of channels allocated by the base station device. In FIG. 4, the horizontal and vertical axes denote time and frequency axes, respectively. The two-dimensional space defined by the time-and-frequency axes is separated in the time axis direction as a sub-frame for every millisecond and is separated in the frequency axis direction for every 1.25 MHz. The base station device allocates channels to resource positions while regarding each of these vertically-and-horizontally separated regions as the minimum unit. In FIG. 4, the non-hatched resource positions are allocated to the uplink shared channels (UL-SCH). The hatched resource positions are allocated to the random access channels (RACH). A part of the resources allocated to the random access channels (RACH) is actually allocated to the mobile station. In the case of FIG. 4, the second, seventh, twelfth, seventeenth, twenty-second, twenty-seventh, thirty-second, thirty-seventh, forty-second, forty-seventh times (sub-frames) counted from the left are resources used for random access. All the resource positions of these sub-frames located in the frequency axis direction are resources used for random access. In this case, the random access channels (RACH) allocated to the mobile station are positioned at 5 ms interval in the time direction. Predetermined resource positions are allocated in the frequency direction. One frame includes 10 sub-frames, and has a length of 10 ms in the time axis direction. A separation between frames is indicated by a heavy line.

Additionally, FIG. 4 illustrates the window times 1 and 2. The shown window time 1 is 19 ms counted from the resource position of the first random access channel (RACH) allocated to the mobile station device. The window time 2 is 40 ms counted from the same resource position. The window time 1 is appropriately updated in some cases. In this case, the position of the window time 1 is changed after the update, which will be explained later.

Figure 5:
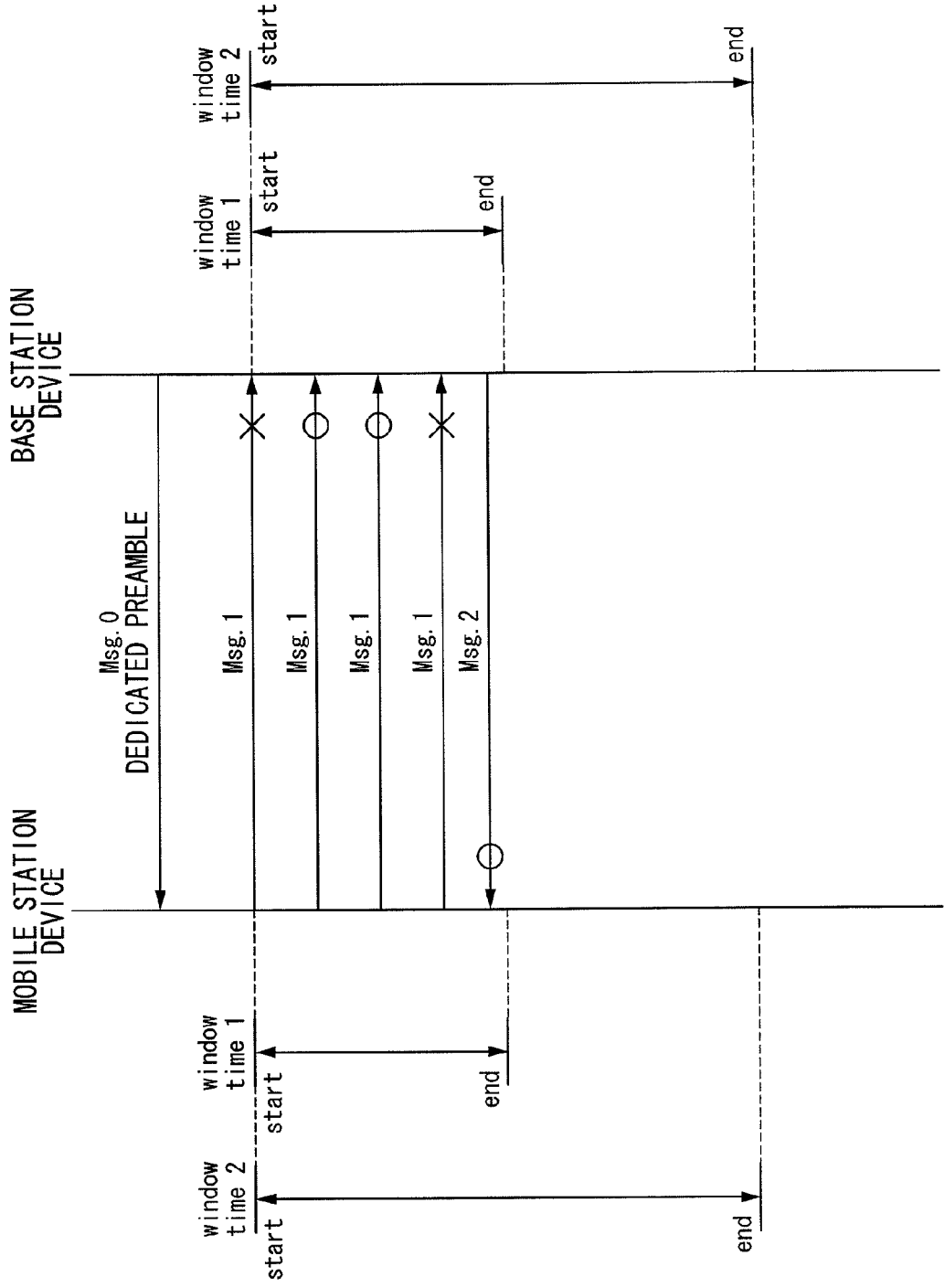
FIG. 5 schematically illustrates a message sequence between the base station device and the mobile station device according to the first embodiment.

FIG. 5 schematically illustrates a message sequence between the base station device and the mobile station device. As shown in FIG. 5, the base station device firstly transmits the message 0 (Msg. 0) including information, such as the dedicated preamble ID allocated to the mobile station device. The mobile station device transmits the message 1 (Msg. 1) within a random access response reception-uncertain period (window time 1) by using the random access channel (RACH) allocated by the base station device. The base station device and the mobile station device manage the time using timers for the window times 1 and 2. In the case of FIG. 5, the start position of the window times 1 and 2 is a scheduled time for transmitting the first message 1. In the case of FIG. 5, the base station device has successfully received the message 1 from the mobile station device within the window time 1, and therefore has transmitted the message 2 (Msg. 2) to the mobile station device within the window time 1. The sequence shown in FIG. 5 will be explained in detail later.

(Operation of Base Station Device Transmitting Message 0)

Hereinafter, an operation of the base station device transmitting the message 0 is explained.

The base station device transmits the message 0 to the mobile station device. The message 0 is generated by the message processor 1092 of the base station device. The message 0 includes random access permission information, 6 bits of a dedicated preamble set, and the window time 2.

Instead of including the window time 2 into the message 0 to be transmitted as in the present embodiment, the window timet may be preliminarily determined so that the base station device and the mobile station device preliminarily have the information concerning the window time 2.

The window time 2 is generated by the window-time managing unit 1091 and informed to the message processor 1092.

The window times 1 and 2 are explained here. The window time 2 is a period for which information informed using the message 0 by the base station device to the mobile station device is valid. The window time 2 is determined for each mobile station device, and is set to be a value equal to or greater than that of the window time 1. If the mobile station device cannot receive the message 2 within the window time 1, and only while it is within the window time 2, the mobile station device retransmits the message 1 using the information specified by the message 0. The base station device uses the window time 2 for this control. The window time 1 is a period within which the base station device can transmit the message 2 and which is counted from the scheduled time for the mobile station device to firstly transmit the message 1. The window time 1 is also used for the normal contention based random access procedure and the non-contention based random access procedure, and is preliminarily informed using the broadcast channel (BCH) or the like. In the present embodiment, the window time 1 is determined so that multiple resource positions of random access channels (RACH) are included in the random access response reception-uncertain period (window time 1) in the time direction.

In the present embodiment, the window times 1 and 2 are set to 19 ms and 40 ms, respectively.

The window time 1 is a period within which the base station device can transmit the message 2 and which is counted from the scheduled position (time) for the base station device to firstly receive the message 1. After the base station device successfully receives the message 1, the base station device can transmit the message 2 at any time as long as it is within the window time 1. For this reason, the mobile station device performs, after transmitting the message 1, control so as to receive the message 2 from the base station device at any time within the window time 1. If the mobile station device has received the message 2 within the window time 1, the mobile station device determines that the base station device has successfully received the message 1.

The same value may be set to the window time 2 among different mobile station devices. Alternatively, a value of the window time 2 may differ for each mobile station device.

Generation, management, and setting of the window times 1 and 2 are performed by the window-time managing unit 1091 of the base station device and the window-time managing unit 2051 of the mobile station device.

The random access permission information is generated by the message processor 1092 communicating with the UL scheduler 1082. The random access permission information included in the message 0 transmitted from the base station device to the mobile station device is information for permitting the mobile station device to perform transmission using multiple random access channels (RACH) within the window time 2. In the present embodiment, the random access permission information includes information concerning frequency positions (resource positions) of random access channels (RACH) available to the mobile station device within the window time 2.

Then, the base station device assigns a dedicated preamble set to the mobile station device in a manner explained later. In other words, the dedicated preamble set includes one or multiple dedicated preamble IDs, and is assigned by the preamble managing unit 1094 in the process explained later, and then is informed to the message processor 1092.

Figure 6:
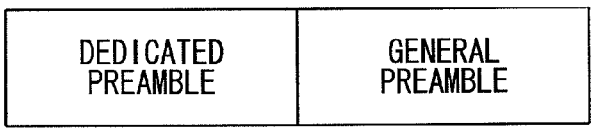
FIG. 6 schematically illustrates a kind of preambles according to the first embodiment.

FIG. 6 schematically illustrates a kind of preambles. The preamble ID is 6 bits of data. There are 64 kinds of preambles. As shown in FIG. 6, the preamble includes two kinds of preambles that are a dedicated preamble and another preamble (called a general preamble in the description). The preamble managing unit 1094 groups and manages the preambles at the RRC level (Layer 3 level).

When the preamble managing unit 1094 assigns a dedicated preamble to the mobile station device, the preamble managing unit 1094 selects a dedicated preamble from the two kinds of preambles that are dedicated preambles and general preambles. Then, the preamble managing unit 1094 confirms the currently-used dedicated preamble ID, and selects, from unused dedicated preambles, a dedicated preamble ID to be assigned to the mobile station device.

The random access permission information and the dedicated preamble are correlated to each other.

In other words, if multiple random access channels (RACH) are allocated in the window time 2, the resource positions of the respective random access channels (RACH) and dedicated preambles to be transmitted at the respective positions, which are correlated to one another, are assigned to the mobile station device. In other words, the base station device allocates multiple time-and-frequency positions (resource positions) within the window time 2 as random access channels (RACH) used by the mobile station device, and assigns dedicated preambles correlated with the respective positions to the mobile station device.

Although different dedicated preambles are assigned to the respective resource positions of random access channels (RACH) in the present embodiment, one (common) dedicated preamble may be assigned to each resource position.

Figure 7:
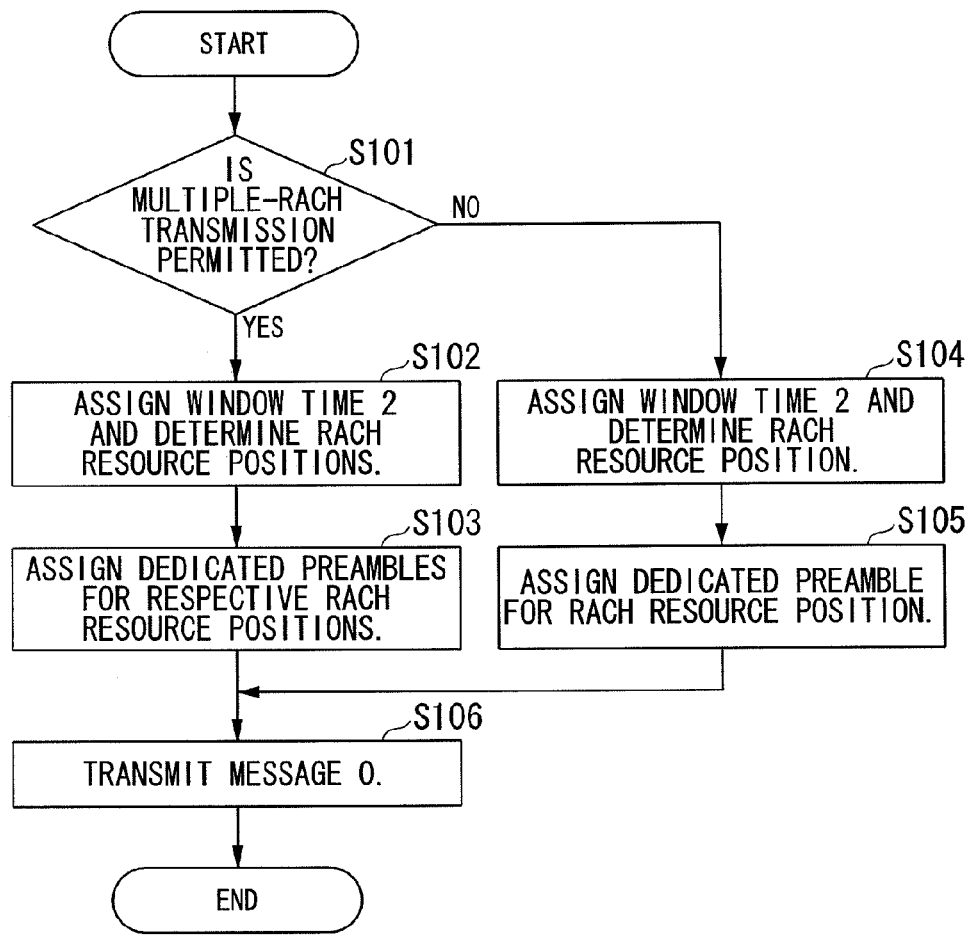
FIG. 7 is a flow chart illustrating a process flow until the base station device according to the first embodiment transmits a message 0.

FIG. 7 is a flow chart illustrating a process flow until the base station device transmits the message 0. The processing performed by the base station device is explained here with reference to FIG. 7.

Firstly, in step S101, the UL scheduler 1082 of the base station device determines whether or not to permit transmission using random access channels (RACH) within the random access response reception-uncertain period (window time 1) while communicating with the random access managing unit 109. An example of the determined criteria will be explained later. If transmission using random access channels (RACH) within the random access response reception-uncertain period (window time 1) is permitted, the routine proceeds to step S102, and if not, the routine proceeds to step S104.

If transmission using random access channels (RACH) within the random access response reception-uncertain period (window time 1) is permitted, the window-time managing unit 1091 communicates with the UL scheduling 1082 and assigns, in step S102, the window time 2 to be used between the mobile station device and the base station device. Also in step S102, the UL scheduler 1082 determines time-and-frequency positions of random access channels (RACH) while communicating with the random access managing unit 109.

The window time 2 is assigned so that multiple random access channels (RACH) are included in the period. In the present embodiment, the window time 2 is set to be 40 ms as explained above. As explained above, the slot interval of random access channels (RACH) is set to 5 ms, and the window time 1 is set to 19 ms.

In the determination of time-and-frequency positions of random access channels (RACH), it is determined which resource of the random access channels (RACH) included in the window time 2 is allocated to the mobile station device. In the present embodiment, the UL scheduler 1082 allocates, to the mobile station device, eight random access channels (RACH) included in the window time 2 among multiple random access channels (RACH) provided for every 5 ms in the time direction (see FIG. 4). In this case, the positions of the eight random access channels (RACH) allocated to the mobile station device are the same in the frequency direction.

If transmission of random access channels (RACH) within the random access response reception-uncertain period (window time 1) is permitted, the preamble managing unit 1094 assigns, in step S103, dedicated preambles to be used at the respective eight random access channels (RACH) in the window time 2 which are allocated to the mobile station device. In the present embodiment, different dedicated preambles are assigned to the respective eight random access channels (RACH). In this case, eight dedicated preambles of "A", "B", "C", "D", "E", "F", "G", and "H" are assigned. These dedicated preambles are collectively called a dedicated preamble set.

After the processing in step S103 ends, the message processor 1092 is informed of in step S106, the dedicated preamble set (6 bits×8 pieces), the window times 2, and the like. Then, the message processor 1092 generates the message 0 including random access permission information, 6 bits of the dedicated preamble set, and the window time 2. Then, the base station device transmits the generated message 0 to the mobile station device using RRC signaling (signaling at the Layer 3 level) or MAC signaling (signaling at Layer 2 level).

On the other hand, if transmission using random access channels (RACH) within the random access response reception-uncertain period (window time 1) is not permitted in step S101, control for transmitting the message 1 within the window time 1 using one random access channel (RACH) is performed.

In other words, in step S104, the window time managing unit 1091 communicates with the SL scheduler 1082 and assigns the window time 2 to be used between the mobile station device and the base station device. Also in step S104, the UL scheduler 1082 communicates with the random access managing unit 109 and determines the time-and-frequency position of a random access channel (RACH). Then, in step S105, the preamble managing unit 1094 assigns one dedicated preamble to be used at the resource position of the random access channel (RACH). The dedicated preamble is one to be transmitted with the message 1 by the mobile station device.

Figure 8:
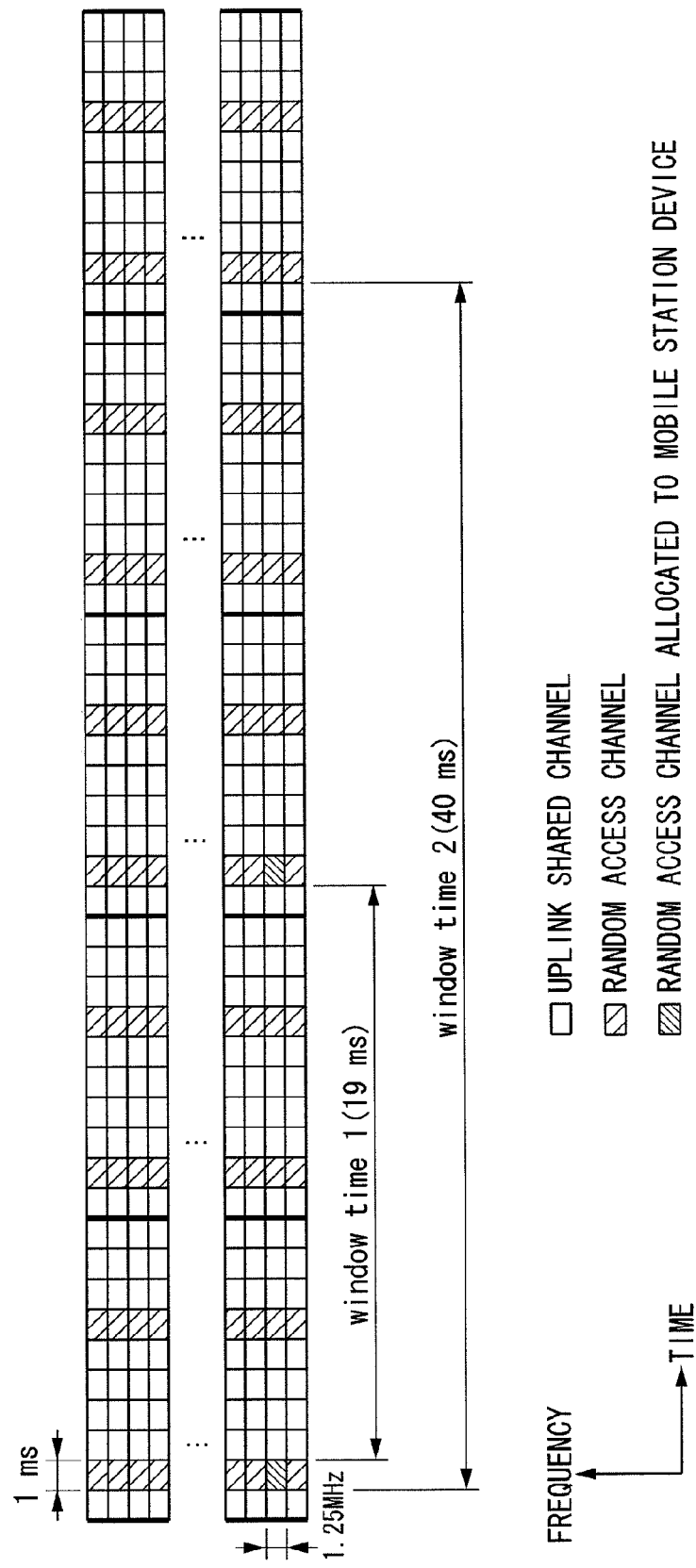
FIG. 8 schematically illustrates an allocation example of channels allocated by the base station device according to the first embodiment when multiple random access channels are not allocated to the mobile station device.

FIG. 8 schematically illustrates a channel allocation when random access channels (RACH) are not allocated to the mobile station device within the random access response reception-uncertain period (window time 1). FIG. 8 shows the positions of resources allocated to channels. The horizontal and vertical axes denote the time and frequency directions, respectively. As shown in FIG. 8, the UL scheduler 1082 allocates two resource positions included in the window time 2 from the hatched random access channels (RACH) to the mobile station device. In other words, the second and twenty-second time positions counted from the left, which are positioned at the second frequency counted from the bottom, are allocated to the mobile station device. Then, the preamble managing unit 1094 specifies dedicated preambles "A" and "E" for the respective resource positions.

Then, information concerning the dedicated preamble set (6 bits of data×2 pieces) and the window time 2 are informed to the message processor 1092.

After the processing in step S105 ends, in the next step S106, the message processor 1092 generates the message 0 including information, such as the random access permission information, the dedicated preamble set (6 bits of data×2 pieces), the window time 2, and the like. Then, the base station device transmits the generated message 0 to the mobile station device.

In this case, the window time 1 is determined so that no RACH resource is allocated to the mobile station device within the window time 1. Also in this case, a value of the random access retransmission interval is equal to or greater than that of the window time 1, indicating that random access retransmission is performed after the window time 1 elapses.

Figure 9:
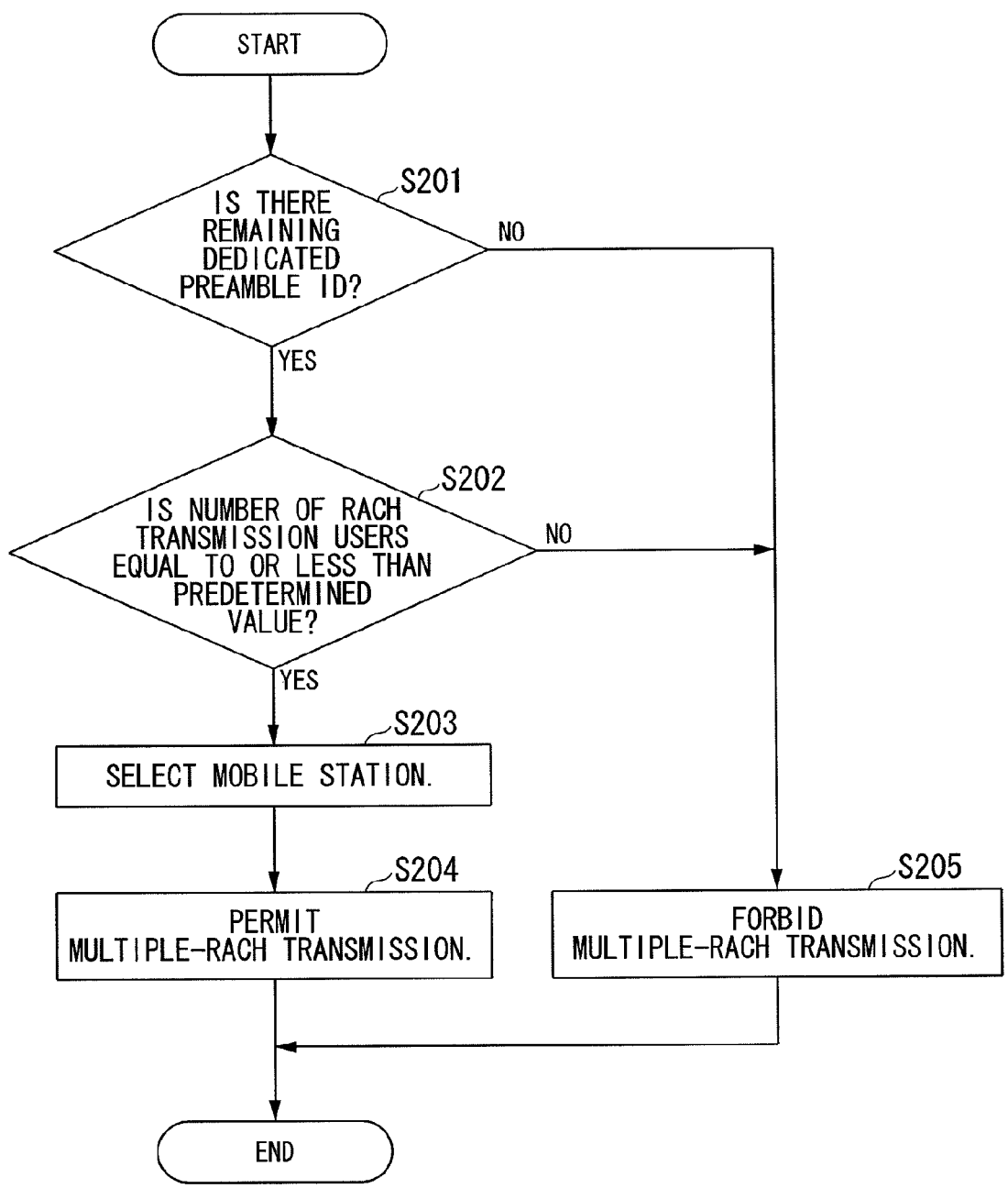
FIG. 9 is a flow chart illustrating a process flow for the base station device according to the first embodiment to determine whether or not to permit transmission of multiple random access channels.

FIG. 9 is a flow chart illustrating a processing procedure for determining in step S101 whether or not to permit transmission using random access channels (RACH) within the random access response reception-uncertain period (window time 1). The determined criteria and the procedure are explained with reference to FIG. 9.

Firstly, in step S201, the UL scheduler 1082 communicates with the preamble managing unit 1094 and determines whether or not a dedicated preamble ID assignable to the mobile station device remains. If an assignable dedicated preamble ID remains, the routine proceeds to step S202. If no assignable dedicated preamble ID remains, the routine proceeds to step S205.

It is determined in step S202 whether or not the number of mobile station devices performing transmission using random access channels (RACH) (i.e., the number of RACH transmission users) is equal to or smaller than a predetermined value. The number of mobile station devices performing transmission using random access channels (RACH) is the total number of mobile station devices performing random access using a dedicated preamble or a general preamble. Such the number of mobile station devices is monitored for a predetermined time period to keep statistics, and then it is determined whether or not the statistical mean value is equal to or smaller than a predetermined value. The predetermined value is determined by the base station device. If the statistical mean value is equal to or smaller than the predetermined value, the routine proceeds to step S203, and if not, the routine proceeds to step S205.

In step S203, a mobile station device is randomly selected from mobile station devices performing random access using a normal dedicated preamble.

Then, it is determined in step S204 that the selected mobile station device is permitted to perform transmission using random access channels (RACH) within the random access response reception-uncertain period (window time 1).

If the determined result is negative in step S201 or step S202, it is determined in step S205 that transmission using random access channels (RACH) within the random access response reception-uncertain period (window time 1) is forbidden.

(Configuration of Message 0)

A configuration of the message 0 is supplementarily explained. There are two ways when transmission of dedicated preambles using resources of random access channels (RACH) is permitted. The first way is a case where the base station device, within the random access response reception-uncertain period (window time 1), permits the mobile station device to transmit dedicated preambles and specifies the positions of the random access channels (RACH). The second way is a case where the base station device, within the random access response reception-uncertain period (window time 1), permits the mobile station device to transmit dedicated preambles, but does not specify the positions of the random access channels (RACH).

When the base station device specifies the positions of the random access channels (RACH), the message 0 includes information concerning permission of transmission of the dedicated preambles (including the positions of random access channels (RACH)), the dedicate preambles, and the window time 2.

When the base station device does not specify the positions of random access channels (RACH), the message 0 includes information concerning permission of transmission of the dedicated preambles (not including the positions of random access channels (RACH)), the dedicate preambles, and the window time 2.

When the message 0 includes information concerning positions of random access channels (RACH), the mobile station device receiving the information transmits the dedicated preambles corresponding to the corresponding positions of the random access channels (RACH) specified by the information.

When the message 0 does not include information concerning the positions of random access channels (RACH), the mobile station device receiving the information determines positions of random access channels (RACH) and then transmits the dedicated preambles using the dedicated preambles specified by the base station device.

(Operation of Mobile Station Device Transmitting Dedicated Preamble (Message 1))

Hereinafter, an operation of the mobile station device transmitting the message 1 is explained.

Figure 10:
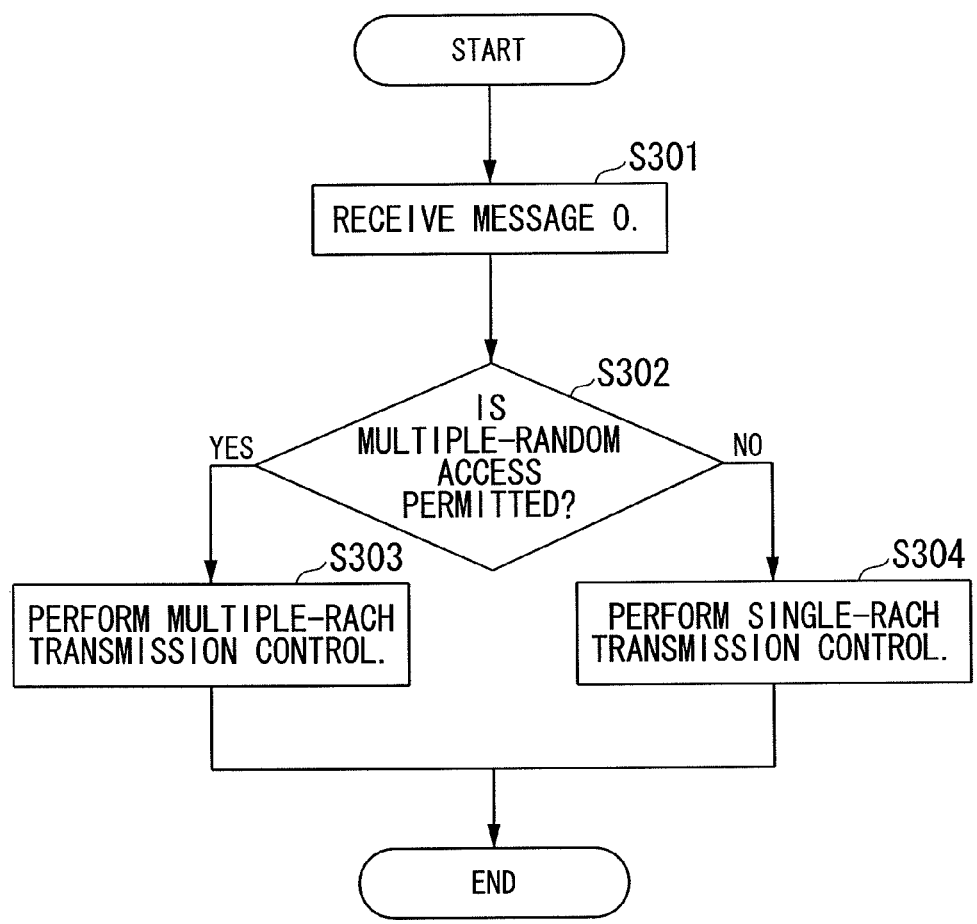
FIG. 10 is a flow chart illustrating a process flow from when the mobile station device according to the first embodiment receives the message 0 to when the mobile station device transmits a dedicated preamble.

FIG. 10 is a flow chart illustrating a processing procedure from reception of the message 0 to transmission of the dedicated preamble.

In step S301 shown in FIG. 10, the mobile station device receives the message 0 transmitted from the base station device.

Then in step S302, the message processor 2053 of the mobile station device extracts information included in the received message 0, and determines whether or not transmission of the messages 1 using random access channels (RACH) within the random access response reception-uncertain period (window time 1) is permitted. In this case, this determination is performed by determining whether or not random access permission information is included in the message 0. If the transmission is permitted as a result of the determination, the routine proceeds to step S303, and if not, the routine proceeds to the step S304.

In step S303, the mobile station device performs control so as to transmit the messages 1 using random access channels (RACH) within the random access response reception-uncertain period (window time 1) (see FIG. 11 that will be explained later). In step S304, the mobile station device performs control so as not to transmit a preamble using a random access channel (RACH) within the random access response reception-uncertain period (window time 1) (see FIG. 11 that will be explained later).

After the processing in steps S303 and S304, the entire process of this flow chart ends.

Figure 11:
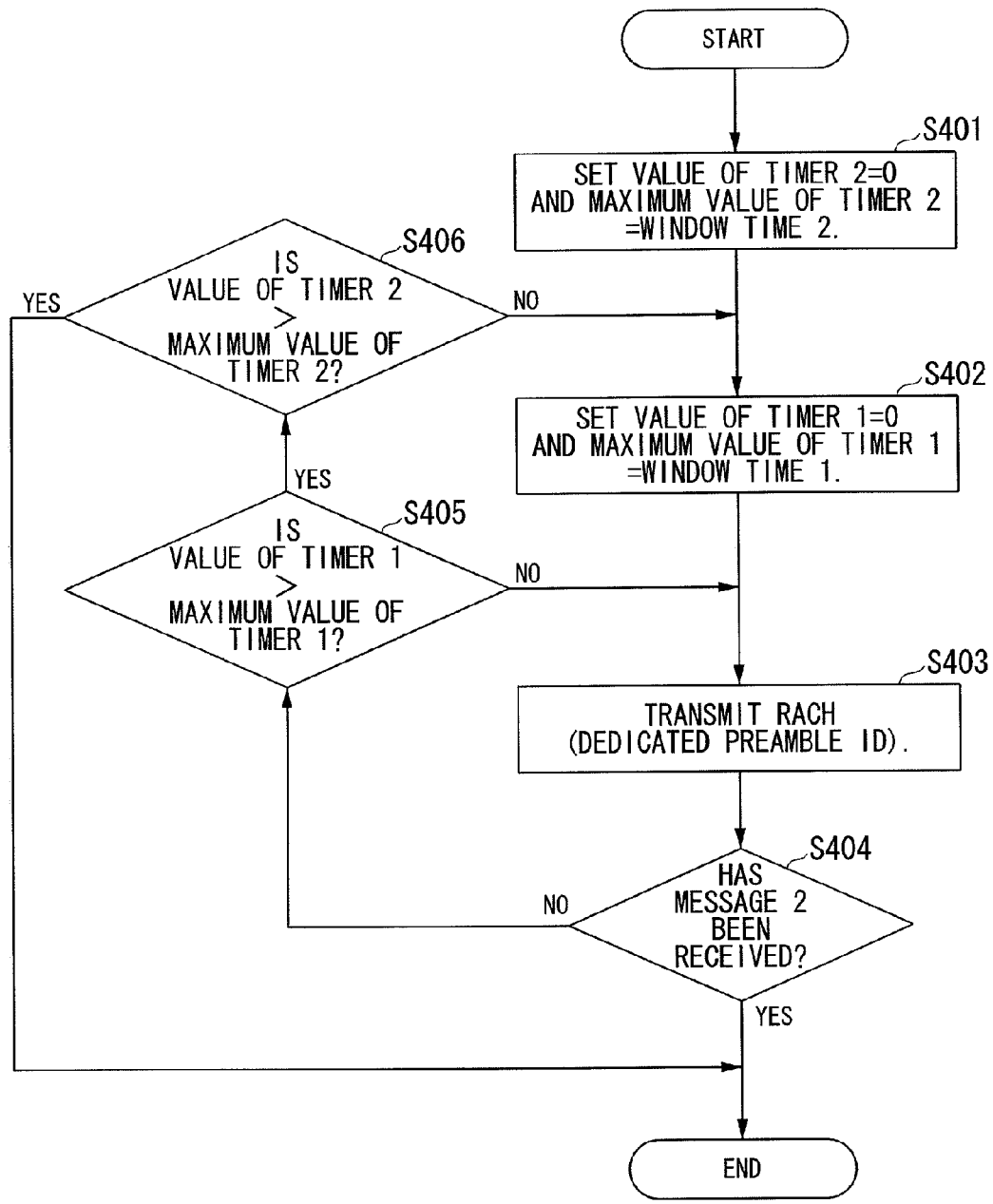
FIG. 11 is a flow chart illustrating a detailed process flow of the flow chart shown in FIG. 10.

FIG. 11 is a flow chart illustrating a more detailed procedure of the process in the aforementioned steps S303 and S304. Hereinafter, a case where transmission of the messages 1 using random access channels (RACH) within the random access response reception-uncertain period (window time 1) is not permitted is explained with reference to FIG. 11. The dedicated preambles "A" and "E" are specified in the message 0 received by the mobile station device.

The message processor 2053 preliminarily informs the preamble selector 2052 of the dedicated preamble ID set (i.e., the dedicated preambles "A" and "E") included in the message 0, and informs the window-time managing unit 2051 of the window time 2.

The window-time managing unit 2051 of the mobile station device includes timers for control based on the window times 1 and 2, which are hereinafter called timers 1 and 2, respectively. A timing start time of each timer is a time for transmitting the first preamble. Each timer continues timing independently from the following processing. In other words, a value of each timer increases as actual time elapses.

Firstly, in step S401, the window-time managing unit 2051 of the mobile station device sets the window time 2, initializes the timer 2 to "0", and sets the maximum value (end value) of the timer 2 to the value of the window time 2 included in the message 0 (40 ms in the present embodiment).

Then, in step S402, the window-time managing unit 2051 of the mobile station device set the window time 1, initializes the timer 1 to "0", and sets the maximum value of the timer 1 to the value of the window time 1 (19 ms in the present embodiment).

Then, in step S403, the preamble selector 2052 of the mobile station device selects the dedicated preamble specified by the base station device and informs the message processor 2053 of the selected dedicated preamble. Then, the mobile station device informs the base station device of the dedicated preamble (message 1) including the dedicated preamble ID using the random access channel (RACH) specified by the base station device.

Then, the message processor 2053 of the mobile station device communicates with the window-time managing unit 2051 and monitors the message 2 from the base station device.

In other words, in step S404, the mobile station device determines whether or not the message 2 has been received. If the message 2 has been received, the entire process of the flow chart ends (normal end). If the message 2 has not been received, the routine proceeds to step S405.

In step S405, the window-time managing unit 2051 of the mobile station device determines whether or not a value of the timer 1 is greater than the maximum value of the timer 1. If the determined result is positive, the routine proceeds to step S406. If the determined result is negative, the routine proceeds to step S403.

In step S406, the window-time managing unit 2051 of the mobile station device determines whether or not a value of the timer 2 is greater than the maximum value of the timer 2. If the determined result in step S406 is positive, i.e., if the message 2 has not been successfully received from the base station device within the window time 2, error information is reported to the upper layer, and then the entire process of the flow chart ends.

If the determined result in step S406 is negative, the routine proceeds to step S402.

In other words, to summarize the process from steps S401 to S406, if the message 2 has not been successfully received from the base station device within the random access response reception-uncertain period (window time 1), the timer 1 is initialized and transmission of the dedicated preamble (message 1) using the random access channel (RACH) repeats as long as it is within the window time 2.

The dedicated preamble used for transmission in step S403 is the dedicated preamble "A" before the window time 1 elapses, and the dedicated preamble "E" after the window time 1 elapses.

Alternatively, in the case of transmitting the dedicated preamble by random access, the system may be configured such that the preamble is always transmitted using the random access channel (RACH) within the random access response reception-uncertain period without determining whether or not to permit transmission using random access channel (RACH) within the random access response reception-uncertain period. In this case, the steps S101, S104, S105, S201 to S205, S302, and S304 are omitted.

Hereinafter, a process when transmission of the messages 1 using random access channels (RACH) within the random access response reception-uncertain period is permitted is explained with reference to FIG. 11. The dedicated preambles "A", "B", "C", "D", "E", "F", "G", and "H" are specified in the message 0 received by the mobile station device.

Firstly, in step S401, the window-time managing unit 2051 of the mobile station device sets the window time 2, initializes the timer 2 to "0", and sets the maximum value (end value) of the timer 2 to the value of the window time 2 included in the message 0 (40 ms in the present embodiment).

Then, in step S402, the window-time managing unit 2051 of the mobile station device sets the window time 1, initializes the timer 1 to "0", and sets the maximum value of the timer 1 to the value of the window time 1 (19 ms in the present embodiment).

Then, in step S403, the preamble selector 2052 of the mobile station device selects the dedicated preambles specified by the base station device and informs the message processor 2053 of the selected dedicated preambles. Then, the mobile station device transmits the dedicated preamble (message 1) including the dedicated preamble ID to the base station device using the random access channel (RACH) specified by the base station device.

Then, the message processor 2053 of the mobile station device communicates with the window-time managing unit 2051 and monitors the message 2 from the base station device.

In other words, in step S404, the mobile station device determines whether or not the message 2 has been received. If the message 2 has been received, the entire process of the flow chart ends (normal end). If the message 2 has not been received, the routine proceeds to step S405.

In step S405, the window-time managing unit 2051 of the mobile station device determines whether or not a value of the timer 1 is greater than the maximum value of the timer 1. If the determined result is positive, the routine proceeds to step S406. If the determined result is negative, the routine proceeds to step S403.

In step S406, the window-time managing unit 2051 of the mobile station device determines whether or not a value of the timer 2 is greater than the maximum value of the timer 2. If the determined result in step S406 is positive, i.e., if the message 2 has not been successfully received from the base station device within the window time 2, error information is reported to the upper layer, and then the entire process of the flow chart ends.

If the determined result in step S406 is negative, the routine proceeds to step S402.

In other words, to summarize the process from steps S401 to S406, transmission of the dedicated preamble (message 1) using the random access channel (RACH) repeats within the random access response reception-uncertain period (window time 1). If the message 2 has not been successfully received from the base station device within the random access response reception-uncertain period (window time 1), the timer 1 is initialized and transmission of the dedicated preamble (messages 1) using the random access channel (RACH) repeats as long as it is within the window time 2. The repetition period is 5 ms.

If reception of the message 2 is confirmed during the repetition, transmission of the dedicated preamble is not necessary afterward, and therefore transmission is not performed.

The dedicated preambles to be transmitted in step S403 before the window time 1 elapses are sequentially selected in the order of the dedicated preambles "A", "B", "C", and "D". The dedicated preambles to be transmitted in step S403 after the window time 1 elapses are sequentially selected in the order of the dedicated preambles "E", "F", "G", and "H".

Since it has been explained in step S404 that the mobile station device determines whether or not the message 2 has been received, a process of detecting the message 2 is explained hereinafter.

The message processor 2053 ceaselessly monitors the physical downlink control channel (PDCCH) within the window time 1 after transmitting the first preamble (after the timing of the timers 1 and 2 being started). This is because the message 2 is scheduled by means of the physical downlink control channel (PDCCH).

The physical downlink control channel includes RA-RNTI that is random access response identification information or C-RNTI that is mobile-station identification information. Which of RA-RNTI and C-RNTI is included in the physical downlink control channel (PDCCH) is informed to the mobile station through the broadcast channel (BCH) or the like, or is determined as common information for the entire system.

If the physical downlink control channel (PDCCH) is scheduled by the random access response identification information RA-RNTI, the mobile station (message processor 2053) detects the random access response identification information RA-RNTI on the physical downlink control channel (PDCCH). If RA-RNTI is detected, the mobile station receives the downlink shared channel, and then detects whether or not the dedicated preamble ID is included in the message 1. If the dedicated preamble ID is detected, the mobile station (message processor 2053) detects that the message 2 has been successfully received, and the process of the entire flow chart ends (normal end). If any of the RA-RNTI and the dedicated preamble ID is not detected, the mobile station detects that the message 2 has not been successfully received, and the routine proceeds to step S405.

On the other hand, if the physical downlink control channel is scheduled by the mobile-station identifier C-RNTI of its own mobile station device, the message processor 2053 detects C-RNTI on physical downlink control channel (PDCCH). Then, the mobile station receives the downlink shared channel, and then detects the message 2. If the message 2 is detected, the message processor 2053 detects that the message 2 has been successfully received, and the process of the entire flow chart ends (normal end). If any of the C-RNTI and the message 2 is not detected, the mobile station detects that the message 2 has not been successfully received, and the routine proceeds to step S405.

As explained above, the random access controller 205 of the mobile station device performs control so as to transmit the message 1 using the dedicated preamble based on the scheduling by the scheduler 204. Additionally, the random access controller 205 performs control so as to repeat transmission of the preamble (message 1) within the predetermined window time 1 if the transmission of the preambles (messages 1) within the random access response reception-uncertain period is permitted. In this case, the random access retransmission interval is equal to or smaller than the window time 1, indicating that random access retransmission is performed before the window time 1 ends.

If the message 2 is not detected even after the window time 1 ends, the random access controller 205 resets the window time 1 as long as it is within the window time 2, and performs control so as to transmit the message 1.

The mobile station device receives the message 0. The message 0 includes information concerning resource positions of multiple random access channels and dedicated preambles which are allocated to the mobile station device. The scheduler 204 schedules random access channels based on the information concerning the resource positions of random access channels included in the message 0. The random access controller 205 performs control so as to transmit the message 1 using the dedicated preamble information included in the message 0.

The random access managing unit 109 of the base station device performs control so as to receive, based on the scheduling by the scheduler 108, the message 1 transmitted from the mobile station device using the dedicated preamble. Additionally, if the message 1 is not received as scheduled, the random access managing unit 109 successively performs control so as to receive the message 1 as long as it is within the predetermined window time 1. If the message 1 has been received within the window time 1, the random access managing unit 109 performs control so as to transmit the message 2 to the mobile station device as a response.

If the message 1 has not been received within the window time 1, the random access managing unit 109 resets the window time 1, and successively performs control so as to receive the message 1 as long as it is within the window time 2. The scheduler 108 allocates multiple resource positions of random access channels to the mobile station device. The random access managing unit 109 includes information concerning the resource positions allocated by the scheduler 108 to the mobile station device in the message 0. The radio unit 104 transmits the message 0.

(Operation of Base Station Device Receiving Dedicated Preamble)

The base station device detects the corresponding dedicated preambles on the random access channels (RACH) preliminarily allocated to the mobile station device using the message 0.

The window-time managing unit 1091 of the base station device includes timers for counting the window times 1 and 2, which are called timers 1 and 2, respectively. The window-time managing unit 1091 control each timer so that each timer starts timing at a scheduled time (position) for receiving the first random access channel (RACH) allocated to the mobile station device. After each timer starts timing, the window-time managing unit 1091 continues timing independently from the following process. In other words, a value of each timer increases as actual time elapses.

Figure 12:
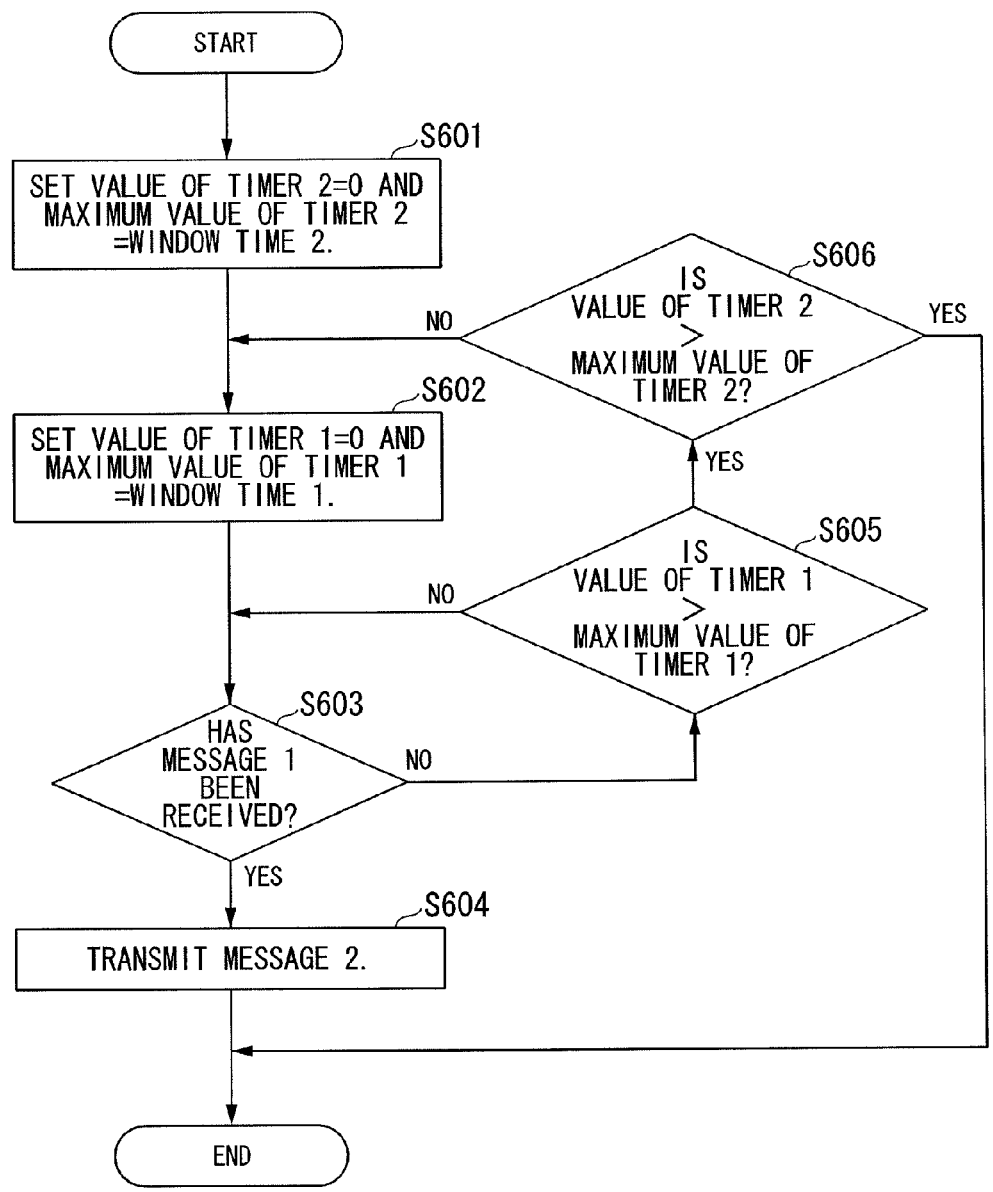
FIG. 12 is a flow chart illustrating a dedicated preamble detecting process performed by the base station device according to the first embodiment.

FIG. 12 is a flow chart illustrating a dedicated-preamble detection process performed by the base station device.

Firstly, a process when the mobile station device is not permitted to transmit the messages 1 using random access channels (RACH) within the random access response reception-uncertain period is explained with reference to FIG. 12.

Firstly, in step S601, the window-time managing unit 1091 of the base station device sets the window time 2, initializes the timer 2 to "0", and sets the maximum value (end value) of the timer 2 to the value of the window time 2 (40 ms in the present embodiment).

Then, in step S602, the window-time managing unit 1091 of the base station device set the window time 1, initializes the timer 1 to "0", and sets the maximum value of the timer 1 to the value of the window time 1 (19 ms in the present embodiment).

The preamble detector 1093 of the base station device detects the corresponding dedicated preamble IDs (message 1) at the scheduled positions for receiving the random access channels (RACH), i.e., at the positions of the random access channels (RACH) preliminarily allocated to the mobile station device using the message 0. As explained above, the window-time managing unit 1091 of the base station device initiates timing of the timers 1 and 2 at the scheduled time for receiving the preamble (message 1).

In step S603, the preamble detector 1093 of the base station device determines whether or not the message 1 has been received. If the message 1 has been received, the routine proceeds to step S604, and if not, the routine proceeds to step S605.

If the message 1 has been detected, the base station device performs transmission of the message 2 in step S604. This processing will be explained later with reference to another drawing. After the processing in step S604, the process of the entire flow chart ends.

In step S605, the window-time managing unit 1091 of the mobile station device determines whether or not a value of the timer 1 is greater than the maximum value of the timer 1. If the determined result is positive, the routine proceeds to step S606. If the determined result is negative, the routine proceeds to step. S603.

In step S606, the window-time managing unit 1091 determines whether or not a value of the timer 2 is greater than the maximum value of the timer 2. If the determined result is positive, the entire process of the flow chart ends. If the determined result is negative, the routine proceeds to step S602.

In other words, to summarize the entire process from steps S601 to S606, if the preamble cannot be detected at the scheduled position (time) for receiving the preamble, the preamble detector 1093 of the base station device repeats detection of reception of the corresponding dedicated preamble at the next scheduled position for receiving the random access channel (RACH) from the mobile station device. In other words, retransmission of the dedicated preamble is performed on the random access channel immediately after the window time 1 ends. For this reason, the preamble detector of the base station performs detection of the dedicated preamble in that timing.

If the message 1 has not been received from the mobile station device within the window time 1, the preamble detector 1093 of the base station device repeats the above procedure as long as it is within the window time 2. In this case, the preamble detector 1093 communicates with the window-time managing unit 1091 and initializes the window time 1.

If the message 1 has not been successfully received within the window time 2, the process ends.

On the other hand, if the base station device 1 has successfully detected the preamble, the message 2 (random access response) is transmitted within the window time 1.

The dedicated preamble to be detected at the scheduled position for receiving the first random access channel (RACH) is the dedicated preamble "A". The dedicated preamble to be detected at the scheduled position for receiving the next random access channel (RACH) (i.e., the dedicated preamble to be detected after the window time 1 ends is the dedicated preamble "E").

Hereinafter, the case where the mobile station device is permitted to transmit the messages 1 using random access channels (RACH) within the random access response reception-uncertain period (window time 1) is explained.

A processing procedure from steps S601 to S606 when the mobile station device is permitted to transmit the messages 1 using random access channels (RACH) within the random access response reception-uncertain period (window time 1) is the same as the processing procedure from steps S601 to S606 when the mobile station device is not permitted to transmit the messages 1 using random access channels (RACH) within the random access response reception-uncertain period (window time 1).

The difference is that there are eight scheduled positions for receiving random access channels (RACH) and that the dedicated preambles to be detected at those positions are "A", "B", "C", "D", "E", "F", "G", and "H".

In other words, as the entire process from steps S601 to 5606, the preamble detector 1093 of the base station device detects the corresponding dedicated preamble "A" (message 1) at the scheduled position for receiving the first random access channel (RACH) from the mobile station device. The window-time managing unit 1091 of the base station device 1 initiates timing of the timers 1 and 2 simultaneously at the scheduled time for receiving the preamble (message 1). When the preamble detector 1093 of the base station device fails to detect the preamble at the scheduled position for receiving the preamble, the preamble detector 1093 of the base station repeats detection of reception of the corresponding dedicated preamble at the scheduled position for receiving the next random access channel (RACH) from the mobile station device.

Also when the dedicated preamble "A" is not detected at the position of the first random access channel (RACH), the base station device repeats processing for detecting reception of the dedicated preambles "B", "C", and "D" at the scheduled positions for receiving random access channels (RACH) from the mobile station device. In the present embodiment, as explained above, the processing for detecting the dedicated preamble is repeated at the interval of 5 ms. In this case, whether or not the dedicated preambles "A", "B", "C", and "D" are received may be determined after multiple preambles are received. Accordingly, it can be determined with higher precision that the mobile station has performed transmission.

If the message 1 has not been received from the mobile station device within the window time 1, the preamble detector 1093 of the base station device repeats, at the interval of 5 ms, the processing for receiving the message 1 at the positions of random access channels (RACH). At the same time, the preamble detector 1093 communicates with the window-time managing unit 1091 and initiates the timer 1 used for control of the window time 1.

The dedicated preambles to be detected within the window time 2 after the window time 1 ends are dedicated preambles "E", "F", "G", and "H".

If the message 1 has not been successfully received from the mobile station device within the window time 2, the process ends.

On the other hand, if the base station device has successfully detected any of the dedicated preambles, the base station device transmits the message 2 (random access response) within the window time 1 (step S604). The process of transmitting the message 2 will be explained hereinafter.

Figure 13:
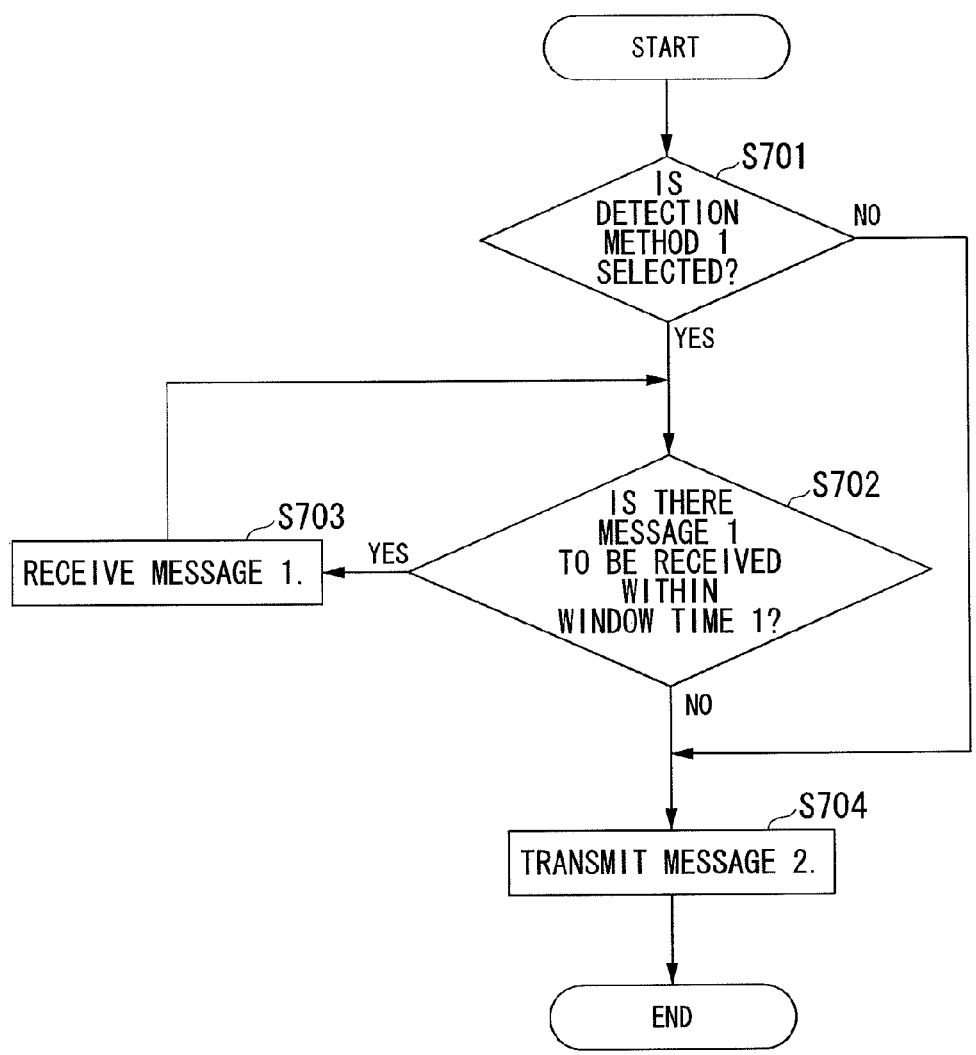
FIG. 13 is a flow chart illustrating a process flow when the base station device according to the first embodiment transmits a message 2.

FIG. 13 is a flow chart illustrating the processing in step S604 explained above, i.e., a processing procedure for the base station device to transmit the message 2.

Which of two preamble detection methods (hereinafter called detection method 1 and 2) as will be explained later is to be used is preliminarily set to the preamble detector 1093 of the base station device.

The detection method 1 is a detection method assuming that reception of the message 1 is performed a multiple number of times within the window time 1, i.e., a method in which detection of the preambles (messages 1) within the window time 1 is performed at one time. In other words, after all the scheduled times for receiving messages 1 within the window time 1 ends, detection of the preambles (messages 1) received at the respective reception-scheduled times is performed at one time. In this case, the base station device transmits the message 2 after receiving all the messages 1 within the window time 1.

The detection method 2 is a method for detecting, one by one, the messages 1 to be received within the window time 1. In this case, immediately after successfully receiving the message 1 within the window time 1, the base station device transmits the message 2.

Hereinafter, explanations are given with reference to the flow chart.

In step S701, the preamble detector 1093 of the base station device determines whether or not to select the detection method 1 by referring to the setting of the preamble detection method. If the detection method 1 is detected, the routine proceeds to step S702. Otherwise (i.e., if the detection method 2 is selected), the routine proceeds to step S704.

In step S702, the preamble detector 1093 determines whether or not the message 1 to be received within the window time 1 remains, i.e., whether or not the position of random access channel (RACH) to be received is still present within the window time 1. If the position is present, the routine proceeds to step S703, and if not, the routine proceeds to step S704.

In step S703, the base station device receives the message 1 and proceeds to step S702.

In step S704, the base station device transmits the message 2 to the mobile station device.

In other words, as the entire process from steps S701 to S704, if the detection method 1 is selected, whether or not the message 1 to be received within the window time 1 is present is determined. If the message 1 is present, reception of the message 1 continues within the window time 1. After detecting that there is no message 1 to be received, the message 2 is transmitted (within the window time 1) after the most-recently-received message 1.

On the other hand, if the detection method 2 is selected, the message 2 is transmitted (within the window time 1) immediately after the message 1 is successfully received.

If the detection method 1 is selected, the base station device can achieve higher precision of detecting messages 1.

Thus, the base station device transmits the message 2 within the window time 1 after successfully detecting the message 1. The base station device generates and transmits the message 2 including a TA (Timing Advance, signal delay-time information) command indicative of the synchronization timing shift with respect to the mobile station device.

Hereinafter, examples of some message sequences are explained.

FIG. 5 explained above illustrates the case where the mobile station device is permitted to transmit the messages 1 using random access channels (RACH) within the random access response reception-uncertain period (window time 1), and the detection method 1 is used. In the case of FIG. 5, the message 0 (Msg. 0) including dedicated-preamble assignment information and the like is transmitted from the base station device to the mobile station device. Then, the mobile station device transmits the message 1 (Msg. 1) to the base station device using the dedicated preamble "A". However, the base station device fails to receive the message 1 (which is shown as "x"). Then, the mobile station device sequentially transmits the message 1 using the dedicated preamble "B" and the message 1 using the dedicated preamble "C". Then, the base station device successfully receives those messages 1 (which are shown as "○"). Then, the mobile station device transmits the message 1 using the dedicated preamble "D". Then, the base station device fails to receive this message 1.

The preamble detector 1093 of the base station device determines whether or not all the preambles (messages 1) respectively including the dedicated preambles "A", "B", "C", and "D" have been detected. Thereby, the preamble detector 1093 detects that the dedicated preambles "B" and "C" have been successfully received.

Then, the message processor 1092 generates the message 2 (Msg. 2), and the base station device transmits the message 2 (Msg. 2) to the mobile station device within the window time 1. Then, the mobile station device successfully receives the message 2. In other words, since the detection method 1 is selected in the case of FIG. 5, the base station device does not transmit the message 2 immediately after successfully receiving the dedicated preamble "B", but transmits the message 2 (within the window time 1) after the scheduled time for receiving the last dedicated preamble "D" within the window time 1.

In this case, the random access ends within the first window time 1. The message 1 is successfully received from the mobile station device within the first window time 1 after the message 0 has been transmitted. Therefore, the base station device transmits the message 2 after receiving all the messages 1 within the window time 1.

The window time 2 may be informed using not message 0, but another channel, such as the broadcast channel (BCH).

Figure 14:
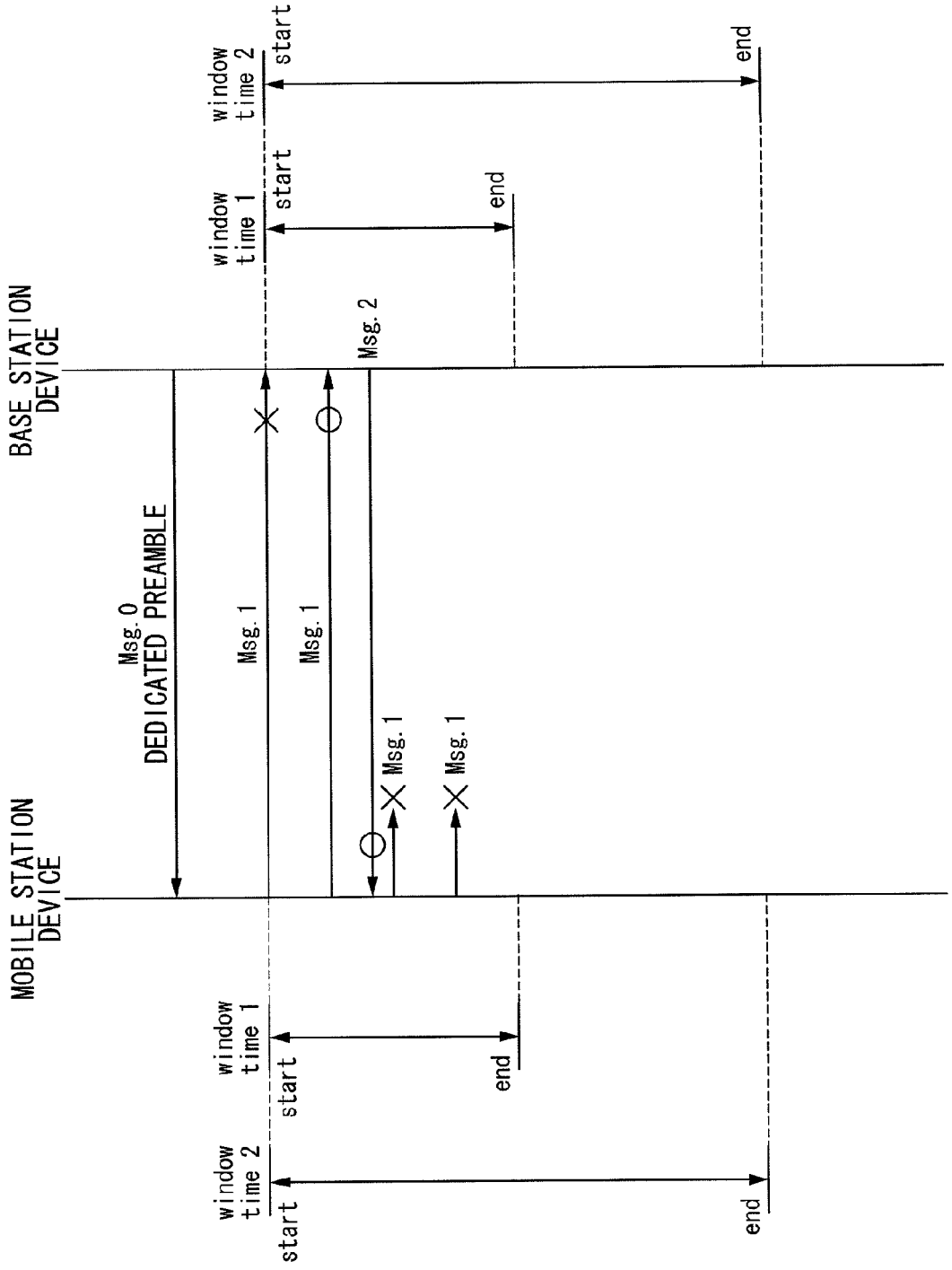
FIG. 14 schematically illustrates an example of a message sequence when a detection method 2 is used in the first embodiment.

FIG. 14 schematically illustrates the case where the mobile station device is permitted to transmit the messages 1 using random access channels (RACH) within the random access response reception-uncertain period (window time 1), and the detection method 2 is used. In FIG. 14, the message 0 including dedicated-preamble assignment information and the like is transmitted from the base station device to the mobile station device. Then, the mobile station device transmits the message 1 (the dedicated preamble "A") to the base station device. However, the base station device fails to receive the message 1. Then, the mobile station device transmits the message 1 (the dedicated preamble "B"). However, the base station device successfully receives this message 1. Since the detection method 2 is selected, the base station device transmits the message 2 to the mobile station device without waiting for the scheduled time for receiving the next random access channel (RACH). Then, the mobile station device successfully receiving the message 2 does not transmit the subsequent dedicated preambles "C" and "D".

In this case, the random access ends within the first window time 1. The base station device transmits the message 2 after having transmitted the message 0 and immediately after successfully receiving the messages 1 from the mobile station device within the first window time 1.

The mobile station device having successfully received the message 2 does not transmit the remaining messages 1.

If the detection method 2 is selected, it can be said for the mobile station device that the window time 1 is shortened to the scheduling interval of dedicated-preambles. In other words, for the mobile station device, the case in which the detection method 2 is selected is similar to a case in which the window time 1 is set to 5 ms (this is informed to the mobile station device using, for example, the message 0), and the eight dedicated preambles ("A", "B", "C", "D", "E", "F", "G", and "H") are assigned in the window time 2. The mobile station device operates accordingly. In this case, the mobile station device transmits the preamble (message 1) including the dedicated preamble "A". Then, if the message 2 is not received within the window time 1, the mobile station device initializes and resets the window time 1. Then, the mobile station device retransmits the preamble (message 1) using the next dedicated preamble.

In this case, the random access retransmission interval is equal to or greater than the window time 1, indicating that random access retransmission is performed after the window time 1 ends. However, it indicates that the window time 1 is shortened compared to the window time 1 used in the normal contention based random access procedure, or to the window time 1 used in the random access procedure when the messages 1 are not transmitted within the random access response reception-uncertain period using random access channels (RACH).

Figure 15:
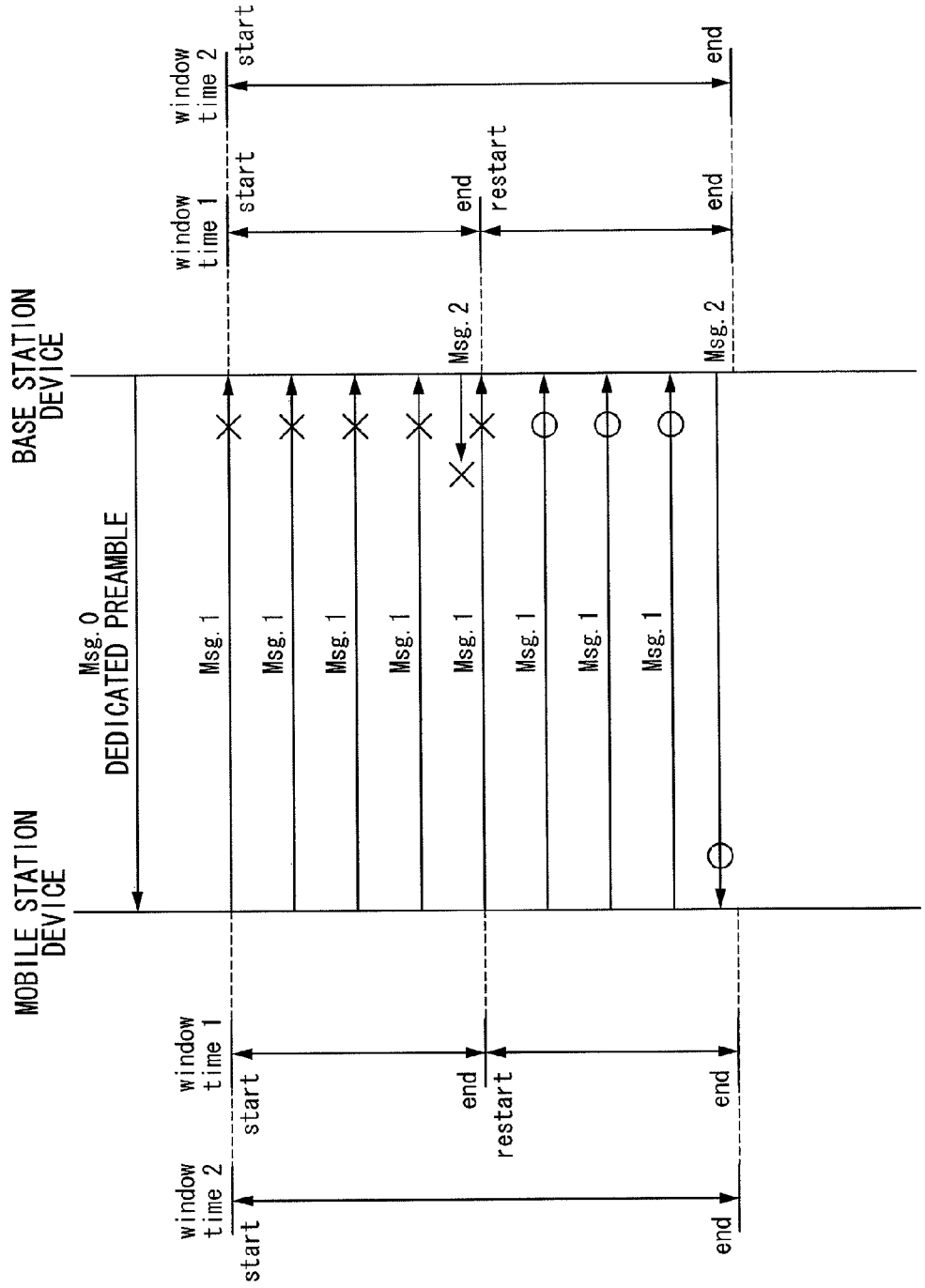
FIG. 15 schematically illustrates an example of a message sequence when a detection method 1 is used in the first embodiment.

FIG. 15 schematically illustrates an example of a message sequence when the detection method 1 is used. In the case of FIG. 15, the random access procedure does not end within the first window time 1, but ends within the next window time 1 after the timer 1 is reset. FIG. 15 shows the case that the base station device has transmitted the message 0, then the message 1 has been repeatedly transmitted within the first window time 1, but the base station device has failed to receive any of those messages 1. In other words, the message 0 including the dedicated-preamble assignment information is firstly transmitted from the base station device to the mobile station device. Then, four messages 1 are sequentially transmitted from the mobile station device to the base station device (using respective dedicated preambles "A", "B", "C", and "D"). However, the base station device fails to receive those messages 1. For this reason, the message 2 is not transmitted from the base station device to the mobile station device within the first window time 1. After the timer 1 for controlling the window time 1 is initialized, four more messages 1 are sequentially transmitted from the mobile station device (using respective dedicated preambles "E", "F", "G", and "H"). Then, the base station device fails to receive the dedicated preamble "E", and successfully receives the subsequent dedicated preambles "F", "G", and "H". Since the base station device successfully receives the message 1 within the second window time 1, the base station device transmits the message 2 to the mobile station device after all the scheduled times for receiving the messages 1 and within the second window time 1.

Figure 16:
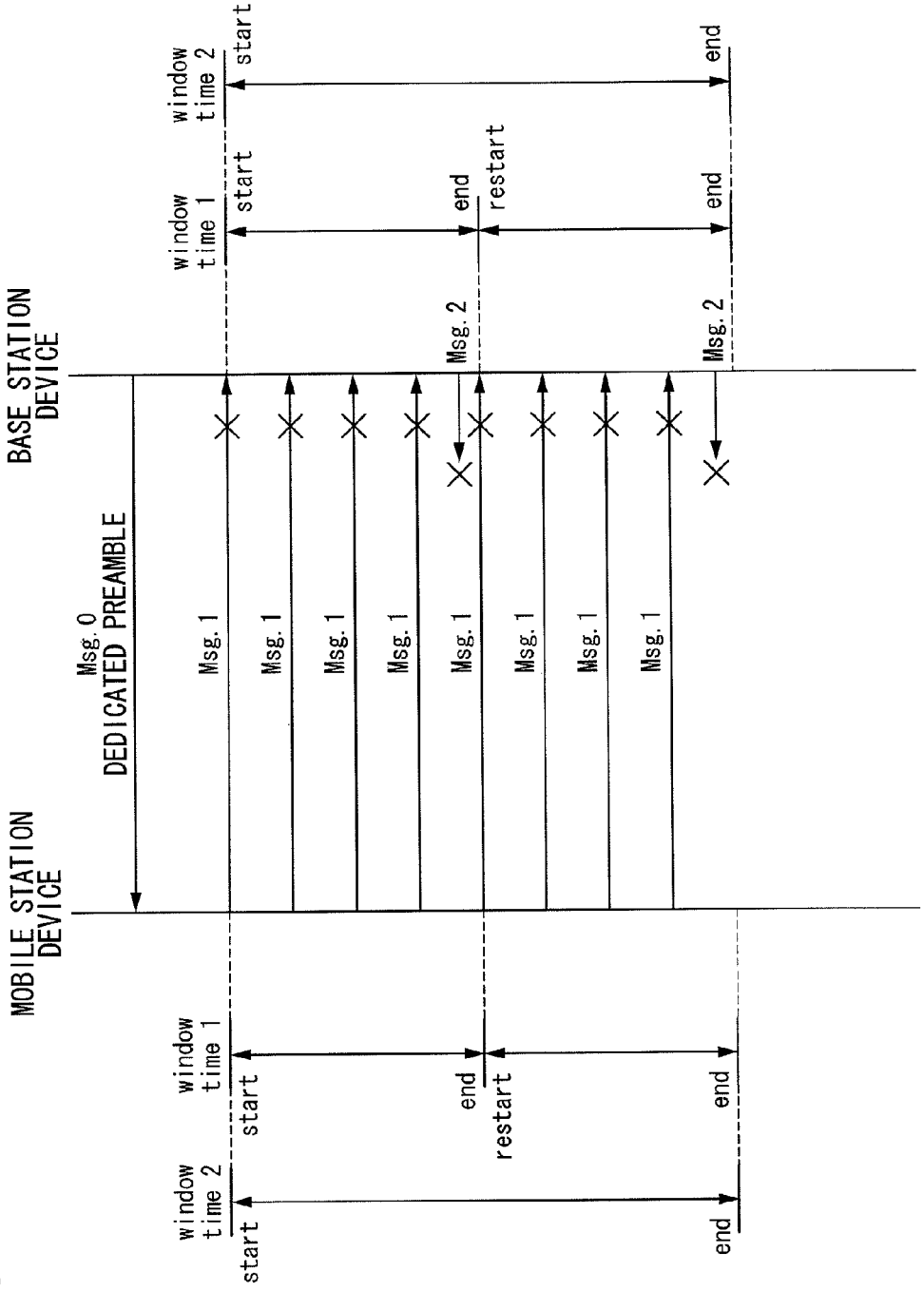
FIG. 16 schematically illustrates a message sequence when the base station device fails to successfully receive the message 1 within a window time 2 in the first embodiment.

FIG. 16 schematically illustrates a message sequence when the base station device has failed to receive the message 1 from the mobile station device even after two of the window times 1 have ended. As shown in FIG. 16, after the message 0 is transmitted from the base station device to the mobile station device, the message 1 is transmitted from the mobile station device to the base station device four times within the first window time 1, and another four times within the next window time 1 restarted after the timer 1 is initialized, i.e., a total of eight times. However, the base station device fails to receive any of those messages 1. Consequently, the message 2 is not transmitted from the base station device to the mobile station device within the window time 2.

When the mobile station device fails to receive the message 2 from the base station device within the window time 2 as explained above, i.e., when the message 2 is not received from the base station device even after two of the window times 1 have ended, the mobile station device deletes and discards all the information (including the random access channel (RACH) assignment information and the dedicated-preamble assignment information) firstly informed using the message 0, and the random access procedure stops.

When no message 1 is received from the mobile station device within the window time 2, the base station device can retry the process from transmission of the message 0 to the mobile station device.

When the message 0 is received from the base station device again, the mobile station device initiates a new set of the random access procedures according to the aforementioned series of procedures, or performs the normal contention based random access procedure.

As explained above, the base station preliminarily reserves the random access channel (RACH) resources and the dedicated preambles as shown in FIG. 4, and permits the mobile station device to transmit the message 1 for a predetermined period within the random access response reception-uncertain period (window time 1), thereby enabling an increase in the possibility that the base station device 1 will successfully receive the message 1 by one random access process (from transmission of the message 0 to transmission of the message 2).

On the other hand, the mobile station device performs transmission of the message 1 using the information specified by the base station device for a predetermined period within the random access response reception-uncertain period (window time 1), thereby enabling an increase in the possibility that the mobile station device will successfully receive the message 2 from the base station device by one random access process (reception of the message 0 to reception of the message 2).

Modified Example of First Embodiment

Figure 17:
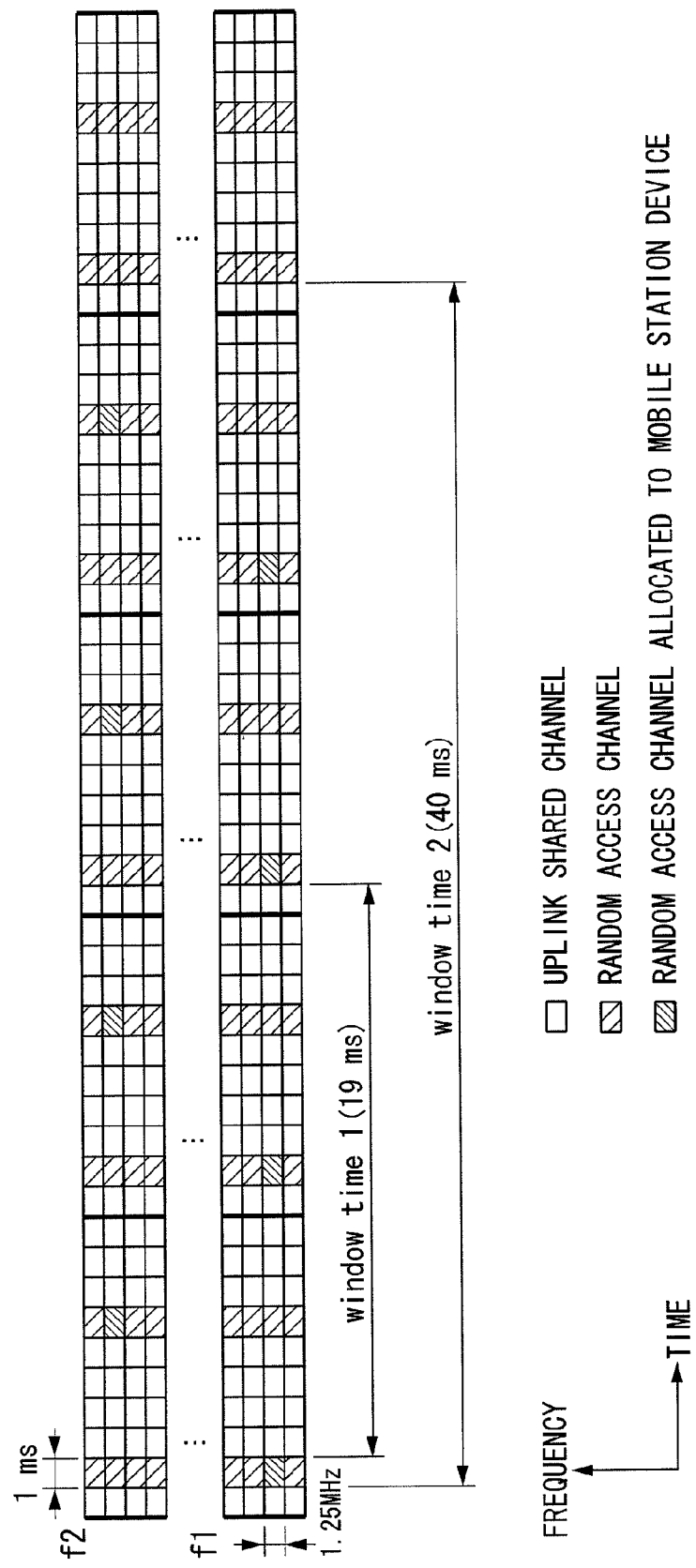
FIG. 17 schematically illustrates positions of random access channels allocated by the base station device to the mobile station device in a modified example of the first embodiment.

FIG. 17 schematically illustrates a modified example of positions of random access channels (RACH) allocated by the base station device to the mobile station device. FIG. 17 shows allocation of resource positions to channels in the two-dimensional space in the time-and-frequency directions. In the case of FIG. 17, the window times 1 and 2 are set to 19 ms and 40 ms, respectively. Four of the positions of random access channels (RACH) are allocated to one mobile station device within the window time 1. Additionally, only one random access channel (RACH) is allocated in one sub-frame (1 ms). The position of the random access channel (RACH) changes with time. In other words, in this case, the frequency position of the first random access channel (RACH) (which has a band of 1.25 MHz denoted as f1 for convenience) differs from the frequency position of the second random access channel (RACH) (5 ms after the first random access channel) (which also has a band of 1.25 MHz denoted as f2). Then, frequency positions of the third, fifth, and seventh random access channels (RACH) are equally f1. On the other hand, frequency positions of the fourth, sixth, and eighth random access channels (RACH) are equally f2. This is called frequency hopping. A pattern of the frequency hopping is also informed using the message 0 by the base station device to the mobile station device. Particularly when the channel characteristics of a particular frequency is bad, frequency hopping is utilized, thereby improving the detection rate of the message 1 for the base station device.

Thus, even when positions of random access channels (RACH) are allocated to a mobile station device using frequency hopping, the mobile station device can sequentially transmit the message 1 if the mobile station device does not receive the message 2 within the window time 1 after firstly transmitting the preamble (message 1) and has a transmission opportunity at the position of the next random access channel (RACH).

Alternatively, the hopping pattern may be reset for each window time 1, or the same hopping pattern may be continuously used for the window time 2.

The positions of the first to eighth random access channels (RACH) are allocated for every 5 ms.

The same dedicated preamble may be assigned for all positions of random access channels (RACH). Alternatively, different dedicated preambles may be assigned to respective positions of random access channels (RACH).

In other words, in the modified example, the scheduler 108 performs scheduling such that a frequency position different from one at the previous time position is allocated to the mobile station device as a random access resource position to be used when multiple random access resource positions expressed by the time-and-frequency positions are specified and allocated to a mobile station device.

Figure 18:
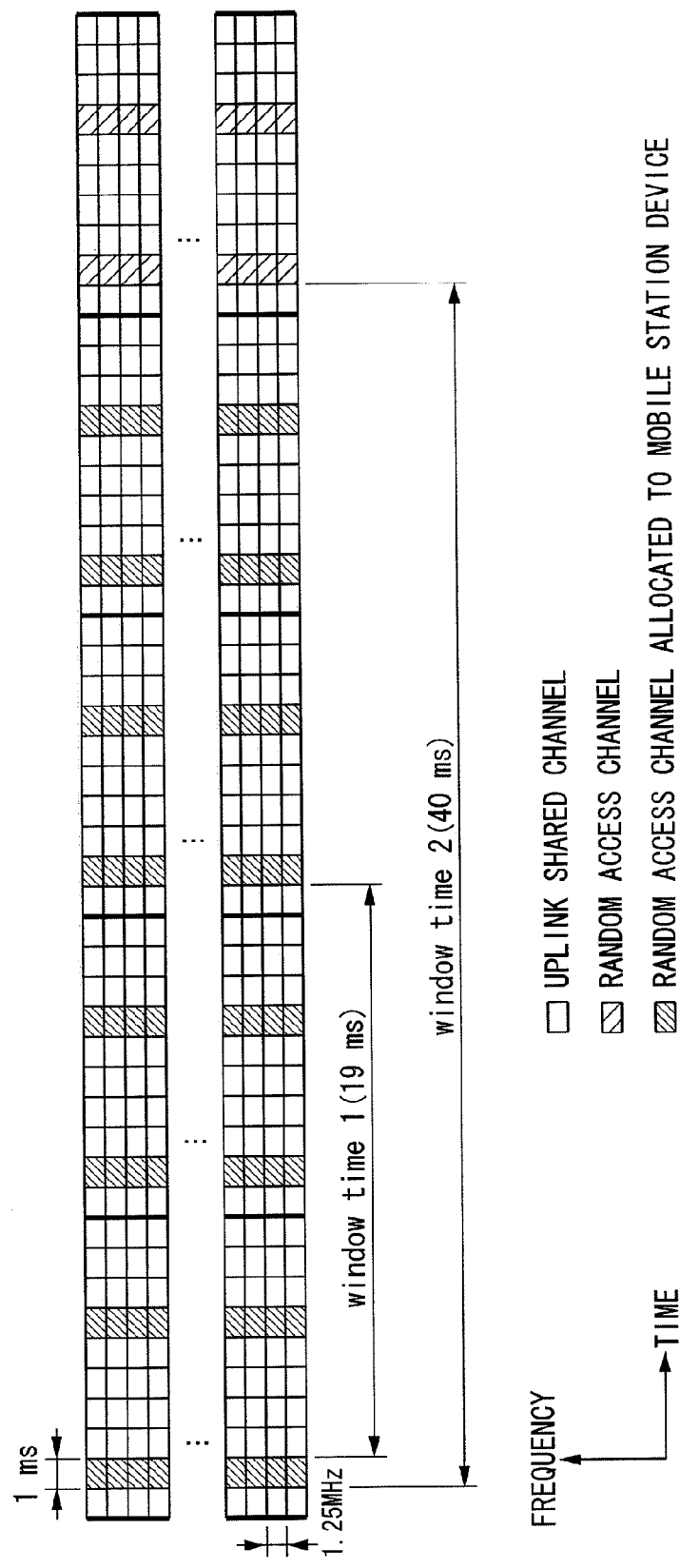
FIG. 18 schematically illustrates positions of random access channels allocated by the base station device to the mobile station device in another modified example of the first embodiment.

FIG. 18 schematically illustrates another modified example of positions of random access channels (RACH) allocated by the base station device to the mobile station device. FIG. 18 also shows allocation of resource positions to channels in the two-dimensional space in the time-and-frequency directions. Also in the case of FIG. 18, the window times 1 and 2 are set to 19 ms and 40 ms, respectively. In this case, the mobile station device determines a hopping pattern. For this reason, the UL scheduler 1082 of the base station device reserves only time positions of random access channels (RACH) within the window time 2, and allocates the reserved time positions to the mobile station device. In other words, a frequency position is not specified for a random access sub-frame (having a band of 1 ms in the time direction). In other words, in the random access sub-frame, all resource positions in the frequency direction are reserved by the mobile station device. Then, the preamble managing unit 1094 of the base station device assigns the dedicated preamble "A" commonly used at the positions of random access channels within the window time 2 to the mobile station device. The message 0 transmitted from the base station device to the mobile station device includes random access permission information, 6 bits of the dedicated preamble ("A"), and the window time 2. The random access permission information does not include time positions and frequency positions of random access channels (RACH), but includes only information (identifier) indicative of permission of transmission of the message 1 within the random access response reception-uncertain period (window time 1). In this case, the mobile station device preliminary has information concerning the time positions of random access channels (RACH). Therefore, the mobile station device appropriately selects a frequency position from random access channels (RACH) at those time positions (for example, the mobile station device randomly selects a frequency position or selects multiple frequency positions according to a predetermined pattern). In the case of using the predetermined pattern, for example, the mobile station device selects, using four frequency positions (called f1, f2, f3, and f4 for convenience each of which having a band of 1.25 MHz), the position f1 for the first and fifth random access sub-frames, the position f2 for the second and sixth random access sub-frames, the position f3 for the third and seventh random access sub-frames, and the position f4 for the fourth and eighth random access sub-frames. In other words, the mobile station device can determine a hopping pattern, thereby improving the success possibility of random access. In this case, the base station device detects the dedicated preamble (aforementioned "A") assigned to the mobile station device at all the positions in the random access sub-frames allocated to the mobile station device.

In other words, in the modified example, when performing scheduling so as to specify multiple random access resource positions expressed by time-and-frequency positions, the scheduler 204 of the mobile station device selects, from candidates of selectable random access resource positions, a frequency position different from one at the previous time position as a random access resource position to be used.

On the other hand, the random access managing unit 109 of the base station device performs control so as to receive the message 1 at the specified time position and at least one of the multiple frequency positions at which the mobile station device can transmit the message 1.

Thus, even when the mobile station device selects and determines frequency positions, the mobile station device can subsequently transmit the message 1 if the mobile station device does not receive the message 2 within the window time 1 after firstly transmitting the preamble (message 1) and if the mobile station device has a transmission opportunity at the position of the next random access channel (RACH).

Thus, even when the mobile station device determines frequency positions of random access channels (RACH), the base station device may assign, to the mobile station device, dedicated preambles different for respective time positions.

The "random access response reception-uncertain period" indicates a period for which the mobile station device can receive a random access response. However, this period may be a random access failure-uncertain period (in which failure of random access is uncertain) of the mobile station device.

Second Embodiment

Hereinafter, a second embodiment of the present invention is explained. The present embodiment explains a case where the mobile station device is permitted to transmit the messages 1 within the random access response reception-uncertain period, and the base station device performs initial setting of the timer for the window time 1 for each message 1.

The "random access response reception-uncertain period" of the present embodiment indicates a period for which the mobile station device can receive a random access response. However, this period may be a random access failure-uncertain period (in which failure of random access is uncertain) of the mobile station device.

When the mobile station device has not received the message 2 from the base station device after having transmitted the message 1, and when the mobile station device has an opportunity of transmitting the next random access channel (RACH), the mobile station device transmits the preamble (message 1).

Also in the present embodiment, the random access sub-frame for the random access channel (RACH) is present for every 5 ms. In the present embodiment, similar to the first embodiment, the window time 2 indicates a validity period of information informed using the message 0, and is used by the base station device and the mobile station device. On the other hand, in the present invention, the window time 1 indicates a period counted from the scheduled time for receiving the message 1, in which the base station device can transmit the message 2. The window time 1 is used only by the base station device. Therefore, the mobile station device does not need to know the window time 1 in the present embodiment. The window time 1 is set and applied for each message 1.

Block diagrams illustrating functional configurations of the base station device and the mobile station device according to the present embodiment are the same as those of the first embodiment.

Figure 19:
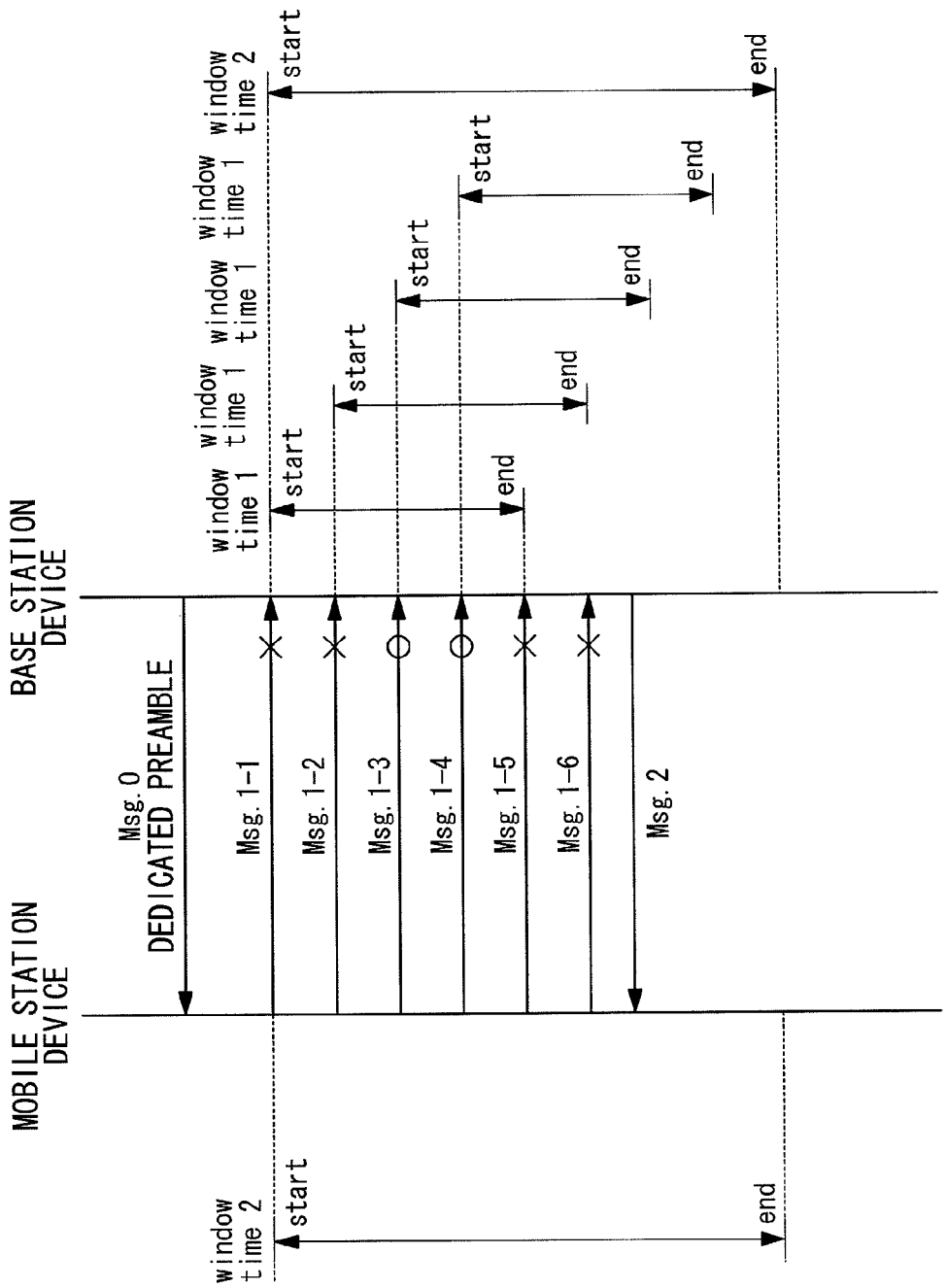
FIG. 19 schematically illustrates a message sequence between the mobile station device and the base station device, and settings of window times 1 and 2 according to a second embodiment of the present invention.

FIG. 19 schematically illustrates a message sequence between the mobile station device and the base station device, and settings of the window times 1 and 2 according to the present embodiment. Hereinafter, transmission and reception of messages in the present embodiment is explained with reference to FIG. 19.

Similar to the first embodiment, in a processing procedure explained here, the base station device informs the mobile station device of positions of random access channels (RACH) through the broadcast channel (BCH) or the downlink shared channel (DL-SCH). The mobile station device is informed of the positions and then precisely confirms the time-and-frequency positions of random access channels (RACH).

(Transmission of Message 0 (Msg. 0))

Firstly, the base station device transmits the message 0 to the mobile station device.

Similar to the first embodiment, the message 0 includes random access permission information, 6 bits of a dedicated preamble set, and the window time 2. The random access permission information includes no time-and-frequency position of random access channel (RACH), but includes an identifier indicating whether or not to permit the mobile station device to transmit the messages 1 within the random access response reception-uncertain period. Only the dedicated preamble "A" is assigned to the 6 bits of the dedicated preamble set.

As a matter of course, the message 0 may be configured to include time-and-frequency positions and a dedicated preamble set.

A channel allocation of the present embodiment is the same as the one shown in FIG. 19 of the first embodiment. The window times 1 and 2 are set to 19 ms and 40 ms, respectively.

(Reception of Message 0)

The mobile station device receives the message 0 from the base station device, and then extracts information concerning the random access permission, the 6 bits of a dedicated preamble set, and the window time 2.

(Transmission of Message 1 (Msg. 1))

Then, the mobile station device appropriately determines frequency positions at time positions of random access channels (RACH) specified by the base station device, and then transmits the first message 1 (message 1-1, Msg. 1-1) including the dedicated preamble "A" to the base station device.

The mobile station device initiates timing of the timer 2 for controlling the window time 2 at the same time with transmission of the message 1-1. Then, the mobile station device sets an end value of the timer 2 to a value of the window time 2. On the other hand, the base station device initiates timing of the timers 1 and 2 for controlling the window times 1 and 2 at the scheduled time for receiving the message 1-1. Then, the base station device set end values of the timers 1 and 2 to the window times 1 and 2, respectively. The base station device starts the timer 1 with respect to the window time 1 at each scheduled time for receiving the message 1. In other words, the base station device includes multiple timers 1 (hereinafter called timers 1-1, 1-2, 1-3, and the like) each measuring the time for each message 1 (each of the messages 1-1, 1-2, 1-3, and the like). The same value is set to end values of these timers 1.

The mobile station device has already known the positions of all the random access channels (RACH) that can be transmitted through information informed by the base station device. Therefore, the base station device selects a frequency position to be used from those positions.

With reference to FIG. 19, the mobile station device has preliminarily known that positions of the random access channels (RACH) that can be transmitted are the hatched resource positions (time positions) of the "random access channels allocated to the mobile station device". Therefore, the mobile station device selects a frequency position at one time position from those positions, and then transmits the preamble (message 1).

(Reception of Message 1)

On the other hand, the base station device does not know which frequency position at each of the time positions of random access channels (RACH) the mobile station device uses to transmit the preamble (message 1) including the dedicated preamble "A". Therefore, the base station device tries to detect the message 1-1 at each possible frequency position. Then, the mobile station device initiates timing of the window times 1 and 2 with respect to the window times 1 and 2, respectively at a scheduled time for receiving the message 1-1 from the mobile station device, regardless of whether or not the message 1 has been successfully received.

Although procedures of transmission and reception of the message 1-1 are explained above, processing procedures of the mobile station device and the base station device for the message 1-2 and the like are similar thereto. However, for the message 1-2 and the like, the timer 2 is not initiated to start timing, the timing of the timer 2 continues from the time of the message 1-1.

(Transmission of Message 2 (Msg. 2))

When the base station device has successfully received the message 1, the base station device transmits the message 2 to the mobile station device at any time within the window time 1 with respect to the message 1.

(Reception of Message 2)

After the mobile station device transmits the message 1 and starts the timer 2, the mobile station device confirms reception of the message 2 within the period of the timer 2. If the mobile station device has not received the message 2 within the period of the timer 2 and has an opportunity for transmitting the next message 1, the mobile station device terminates transmission of the message 1. On the other hand, if the mobile station device has received the message 2 within the period of the timer 2, and has an opportunity for transmitting the remaining messages 1, the mobile station device terminates transmission of the message 1. In this case, the base station device does not start the timer 1-2 with respect to the message 1-2.

In the sequence shown in FIG. 19, there are eight opportunities for the mobile station device to transmit the preamble (message 1) within the window time 2 firstly set. These are opportunities for transmitting the messages 1-1, 1-2, 1-3, 1-4, 1-5, 1-6, 1-7 (not shown), and 1-8 (not shown).

Then, the preamble detector 1093 of the base station device is configured to select the detection method 1 explained in the first embodiment.

As shown in FIG. 19, the base station device fails to receive the messages 1-1, 1-2, 1-5, and 1-6, and successfully receive the messages 1-3 and 1-4. The base station device may receive the message 2 immediately after first successfully receiving the message 1-3, or receive the message 2 immediately after the scheduled time for receiving the message 1-6. In any of the cases, the message 2 has to be transmitted before the end of the window time 1 with respect to the message 1 successfully received. Within this period, the DL scheduler 1081 of the base station device determines a time for transmitting the message 2. In the illustrated case, the base station device transmits the message 2 after the scheduled time for receiving the message 1-6 and before the end of the timer 1 for the message 1-3.

Hereinafter, the detailed processing procedures of the mobile station device and the base station device in the aforementioned sequence are explained.

(Reception of Message 0)

The message processor 2053 of the mobile station device receives the message 0 from the base station device and extracts, from the message 0, information concerning random access permission, 6 bits of a dedicated preamble set, and the window time 2.

A process flow for the base station device to transmit the message 0 is based on the procedure shown in FIG. 7 similarly to the first embodiment. Therefore, explanations thereof are omitted here.

The processing procedure for the mobile station device from reception of the message 0 to transmission of the dedicated preamble is performed based on the procedure shown in FIG. 10. Therefore, explanations thereof are omitted here. Here, as a result of the determination in step S302, the routine proceeds to step S303 in which the mobile station device performs control so as to perform transmission using the random access channel (RACH) within the random access response reception-uncertain period.

(Transmission and Reception of Message 1)

Figure 20:
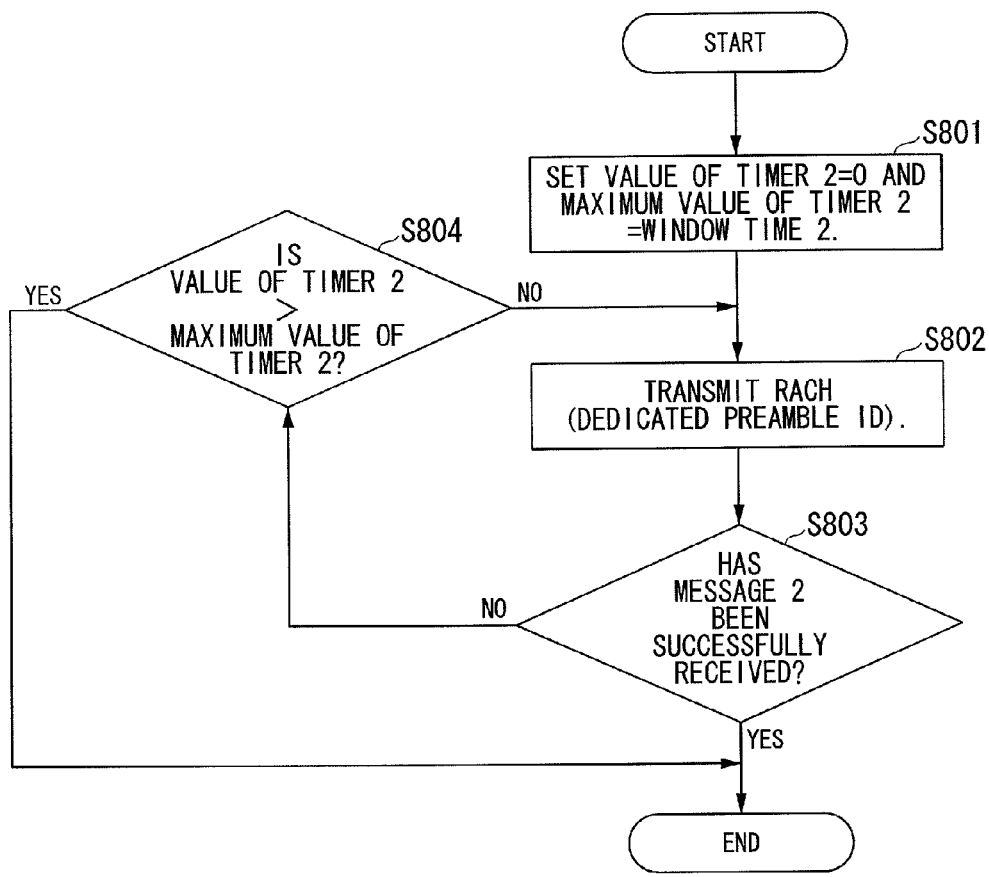
FIG. 20 is a flow chart illustrating a process flow for the mobile station device according to the second embodiment to transmit the message 1.
Figure 21:
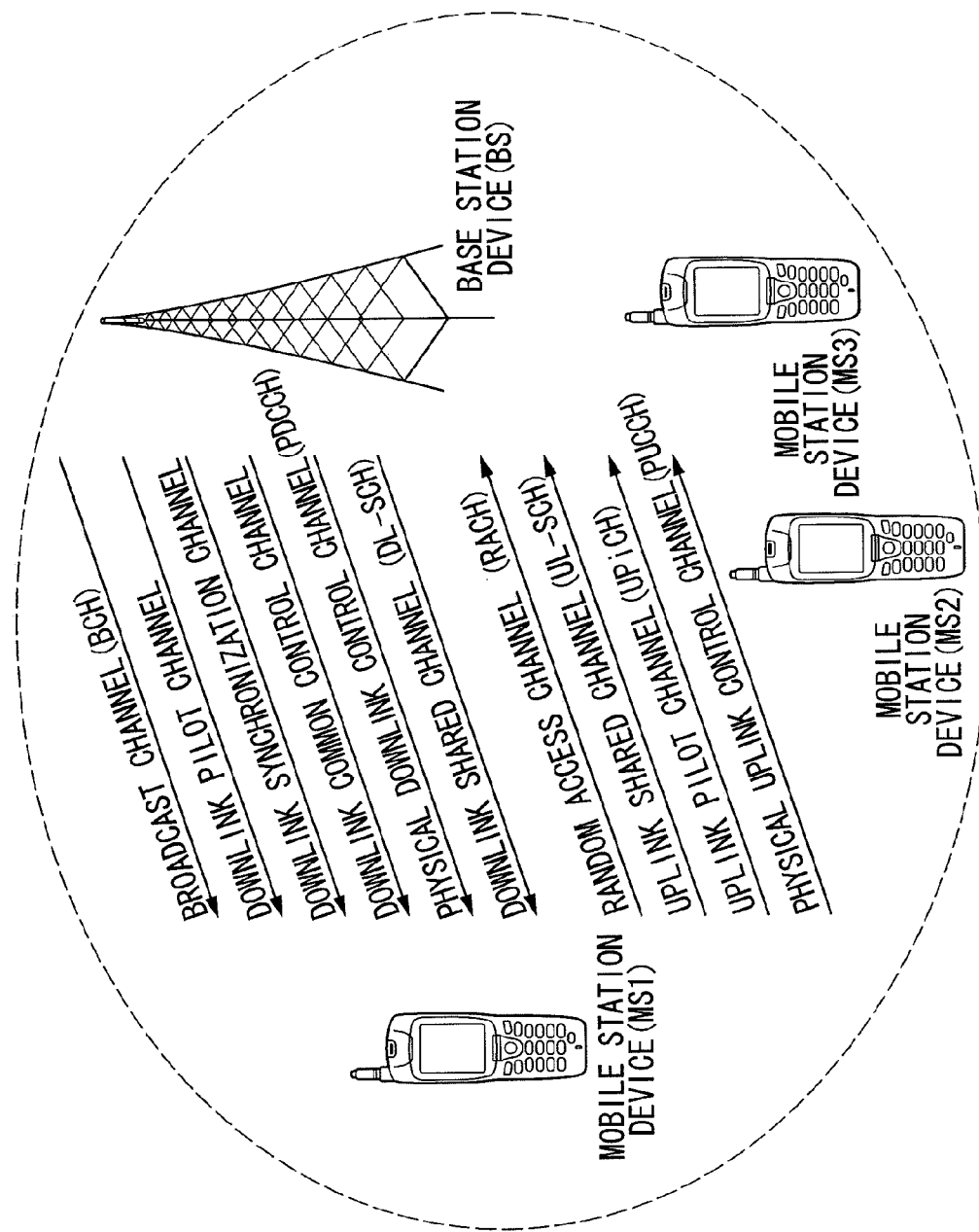
FIG. 21 schematically illustrates a communication system of EUTRA that is a related art.
Figure 22:
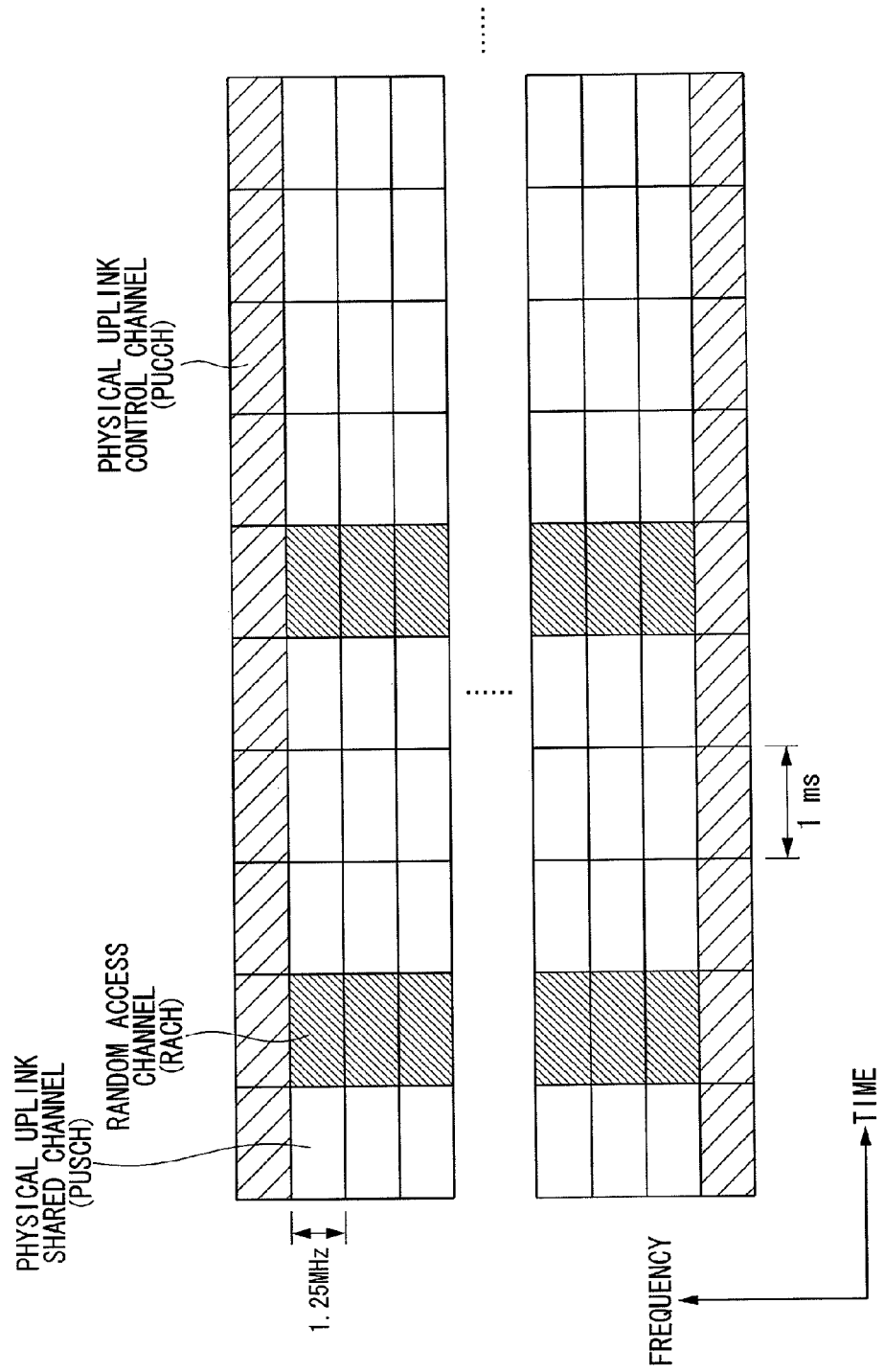
FIG. 22 schematically illustrates an allocation example of random access channels (RACH), uplink shared channels (UL-SCH), and physical uplink control channels (PUCCH) in EUTRA uplink, which is a related art.
Figure 23:
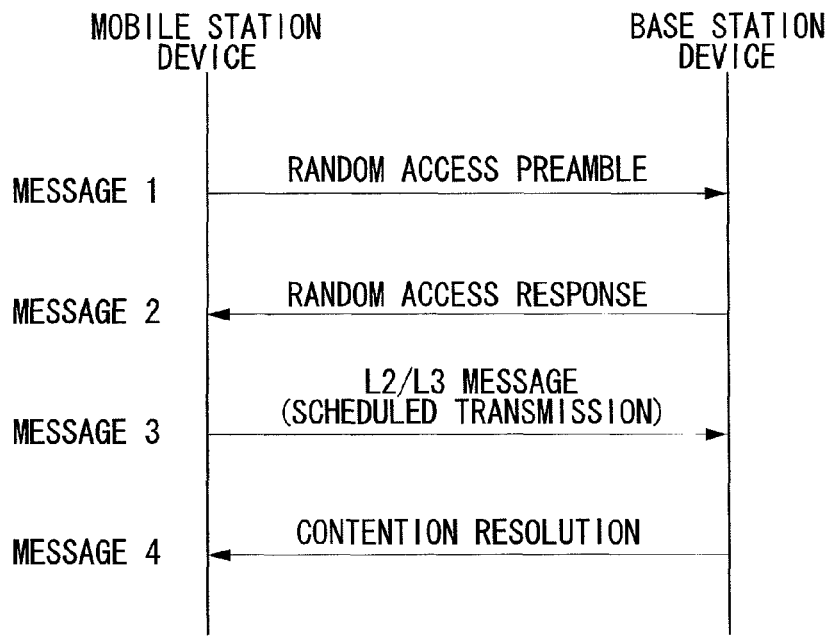
FIG. 23 is a sequence chart illustrating a typical random access procedure that is a related art.
Figure 24:
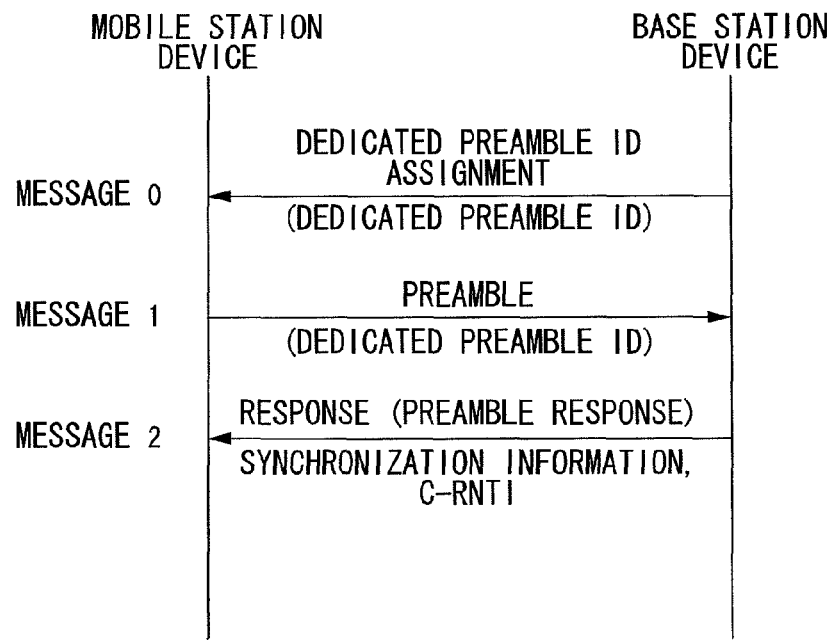
FIG. 24 is a sequence chart illustrating a random access procedure using a dedicated preamble which is a related art.

FIG. 20 is a flow chart illustrating a processing procedure for the mobile station device to transmit the messages 1 in the present embodiment. Hereinafter, processing when the mobile station device is permitted to transmit the messages 1 using random access channels (RACH) within the random access response reception-uncertain period is explained with reference to FIG. 20. As explained above, the dedicated preamble "A" is specified using the message 0 received by the mobile station device.

Firstly, in step S801, the window-time managing unit 2051 of the mobile station device sets the window time 2, initializes the timer 2 to "0", and sets the maximum value (end value) of the timer 2 to a value of the window time 2 included in the message 0 (40 ms in the present embodiment).

Then, in step S802, the preamble selector 2052 of the mobile station device selects the dedicated preamble specified by the base station device and informs the message processor 2053 of the selected dedicated preamble. Then, the mobile station device transmits the dedicated preamble (message 1) including the dedicated preamble ID to the base station device using the random access channel (RACH) specified by the base station device.

Then, the message processor 2053 of the mobile station device communicates with the window-time managing unit 2051 and monitors the message 2 from the base station device.

In other words, in step S803, the mobile station device determines whether or not the message 2 has been received. If the message 2 has been received, the entire process of the flow chart ends (normal end). If the message 2 has not been received, the routine proceeds to step S804.

In step S804, the window-time managing unit 2051 of the mobile station device determines whether or not a value of the timer 2 is greater than the maximum value of the timer 2. If the determined result in step S804 is positive, i.e., if the message 2 has not been successfully received from the base station device within the window time 2, error information is informed to the upper layer, and the entire process of the flow chart ends.

If the determined result in step S804 is negative, the routine proceeds to step S802.

In other words, to summarize the process from steps S801 to S804, if the message 2 has not been successfully received from the base station device within the window time 2, the mobile station device repeats transmission of the dedicated preamble (message 1) using the random access channels (RACH) as long as it is within the window time 2. The repetition period is 5 ms.

If reception of the message 2 is confirmed during the repetition process, the dedicated preamble does not need to be transmitted afterward, and therefore transmission is not performed.

The dedicated preamble "A" is selected for the dedicated preamble used for every transmission in step S802.

The message processor 2053 of the mobile station device transmits the message 1-1. The window-time managing unit 1091 of the base station device starts the timer 1-1 immediately after the scheduled time for receiving the message 1-1. The timer started for each message 1 is deleted when the end value (i.e., the period of the window time 1) elapses.

The preamble detector 1093 of the base station device receives the message 1 according to the procedure shown in FIGS. 12 and 13 similarly to the first embodiment.

Since the detection method 1 is selected, the preamble detector 1093 of the base station device determines whether or not the message 1 has been detected when four scheduled times for receiving the messages 1 (scheduled times for receiving the messages 1-1 to 1-4) have elapsed, i.e., before the timer 1-1 with respect to the message 1-1 ends. In other words, detection determination of the message 1 is performed for each timer when four scheduled times for receiving the messages 1 elapse.

If the mobile station device does not successfully receive the message 2 by the scheduled time for transmitting the message 1-2 (next message 1), the mobile station device appropriately determines a frequency position and then transmits the message 1-2 including the dedicated preamble "A". At the same time, the base station device starts the timer 1-2 at the scheduled time for receiving the message 1-2. At this time, the timers 1-1 and 1-2 of the base station device are measuring the time.

Then, if the mobile station device does not successfully receive the message 2 by the scheduled time for transmitting the message 1-3 (next message 1), the mobile station device appropriately determines a frequency position and then transmits the message 1-3 including the dedicated preamble "A". At the same time, the base station device starts the timer 1-3 at the scheduled time for receiving the message 1-3. At this time, the timers 1-1, 1-2, and 1-3 of the base station device are measuring the time.

Then, if the mobile station device does not successfully receive the message 2 by the scheduled time for transmitting the message 1-4 (next message 1), the mobile station device appropriately determines a frequency position and then transmits the message 1-4 including the dedicated preamble "A". At the same time, the base station device starts the timer 1-4 at the scheduled time for receiving the message 1-4. At this time, the timers 1-1, 1-2, 1-3, and 1-4 of the base station device is measuring the time.

At this time, the preamble detector 1093 of the base station device collectively determines whether or not the four messages 1 have been detected within the period measured by the timer 1-1, i.e., the four messages 1 of the messages 1-1 to 1-4. As a result, the preamble detector 1093 detects that the messages 1-3 and 1-4 have been successfully received. Then, the DL scheduler 1081 of the base station device transmits the message 2 by the end (expiration) time of the timer 1-3 with respect to the message 1-3 that is the message 1 having been firstly detected between the two messages (messages 1-3 and the message 1-4). In the sequence shown in FIG. 19, the scheduling has been performed such that the base station device transmits the message 2 after the scheduled time for receiving the message 1-6.

Further, if the mobile station device does not successfully receive the message 2 by the scheduled time for transmitting the message 1-5 (next message 1), the mobile station device appropriately determines a frequency position and then transmits the message 1-5 including the dedicated preamble "A". At the same time, the base station device starts the timer 1-5 at the scheduled time for receiving the message 1-5. In the base station device, the timer 1-1 ends (expires) at the scheduled time for receiving the message 1-5. In other words, at this time, the timers 1-2, 1-3, 1-4 and 1-5 of the base station device is measuring the time.

Then, if the mobile station device does not successfully receive the message 2 by the scheduled time for transmitting the message 1-6 (next message 1), the mobile station device appropriately determines a frequency position and then transmits the message 1-6 including the dedicated preamble "A". At the same time, the base station device starts the timer 1-6 at the scheduled time for receiving the message 1-6. In the base station device, the timer 1-2 ends (expires) at the scheduled time for receiving the message 1-6. In other words, at this time, the timers 1-3, 1-4, 1-5, and 1-6 of the base station device are measuring the time.

On the other hand, the base station device transmits the message 2 on the aforementioned schedule during a period from the scheduled time for receiving the message 1-6 to when the timer 1-3 ends (expires) (the scheduled time for receiving the message 1-7).

Then, the mobile station device receives the message 2.

Then, since the mobile station device have received the message 2 from the base station device by the scheduled time for transmitting the next message 1 (not shown), the mobile station device performs control so as not to transmit another message 1. At this time, the timer 1 with respect to the message 1 does not start.

Afterwards, with respect to the timers, the base station device waits for the timers 1-3, 1-4, 1-5, and 1-6 to end.

As explained above, even when a timer with respect to the window time 1 is set for each message 1, if transmission of random access channels (RACH) is permitted within a unit time (random access response reception-uncertain period) upon random access using a dedicated preamble, the messages 1 are transmitted using the random access channels (RACH), thereby enabling an increase in the success probability of the random access channels (RACH).

In this case, the random access retransmission interval is equal to or smaller than the value of the window time 1, indicating that random access retransmission is performed before the window time 1 ends. For the mobile station device, the window times 1 and 2 are the same.

Another Modified Example

The present invention is not limited to the above embodiments, and various modifications can be made. In the above embodiments, the present invention is not limited to the configurations and the like shown in the accompanying drawings, and various modifications can be made without departing from the scope of the present invention within which the effects of the present invention can be achieved. Further, various modifications can be made without departing from the purposes of the present invention.

Processing of each unit may be implemented by storing a program for implementing the functions explained in the present embodiments into a computer-readable recording medium, and by having a computer system read and execute the program stored in the recording medium. The "computer system" includes an OS and hardware, such as peripheral devices.

Additionally, the "computer system" includes environments that provides home pages (or display environments) if a WWW system is used.

The "computer-readable recording medium" includes a portable medium, such as a flexible disk, an optical disc, an ROM, a CD-ROM, and the like, and a storage device such as a hard disk installed in a computer system. The "computer-readable recording medium" includes a medium dynamically storing a program for a short period, such as a communication line when a program is transmitted through a network such as the Internet or a communication line such as a telephone line. Additionally, the "computer-readable recording medium" includes a medium storing a program for a given period, such as volatile memory in a computer system of a server or a client in the above case. The program may be one for implementing a part of the aforementioned functions or one for implementing the aforementioned functions by combining another program stored in the computer system.

Although it has been explained so far for convenience that processing is performed between one base station device and one mobile station device, there may be multiple base station devices and mobile station devices, as a matter of course.

Additionally, the type of wireless access schemes is not limited to known schemes, such as W-CDMA, cdma 2000, wireless LAN, PHS, and the like, and the present invention is applicable to communication schemes that will be implemented in the future.

The invention claimed is:

1. A mobile station apparatus in a communication system performing non-contention based random access to a base station apparatus, the mobile station apparatus comprising:

a receiver configured to receive, from the base station apparatus, a dedicated preamble ID which is used for first transmission and retransmission, and which is uniquely assigned by the base station apparatus to avoid a preamble contention among a plurality of mobile station apparatuses, and random access resource information which is used for first transmission and retransmission; and a transmitter configured to:
transmit, to the base station apparatus via a resource specified by the random access resource information, a preamble generated by using the dedicated preamble ID, and
retransmit the preamble to the base station apparatus via the resource in a case that a response to the preamble fails to be received after the preamble is transmitted within a predetermined period which is determined based on the random access resource information.

2. The mobile station apparatus according to claim 1, wherein the same dedicated preamble ID is used for the first transmission and the retransmission.

3. The mobile station apparatus according to claim 1, wherein time resources to be used when the mobile station apparatus transmits and retransmits the preamble to the base station apparatus are periodically allocated, based on the random access resource information.

4. A communication method for a mobile station apparatus performing non-contention based random access to a base station apparatus, the communication method comprising:
　　receiving, from the base station apparatus:
　　　　a dedicated preamble ID which is used for first transmission and retransmission, and is uniquely assigned by the base station apparatus to avoid a preamble contention among a plurality of mobile station apparatuses, and
　　　　random access resource information which is used for the first transmission and the retransmission;
　　transmitting a preamble generated by using the dedicated preamble ID to the base station apparatus via a resource specified by the random access resource information; and
　　retransmitting the preamble to the base station apparatus via the resource in a case that a response to the preamble fails to be received after the preamble is transmitted within a predetermined period which is determined based on the random access resource information.

5. The communication method according to claim 4, wherein the same dedicated preamble ID is used for the first transmission and the retransmission.

6. The communication method according to claim 4, wherein time resources to be used when the mobile station apparatus transmits and retransmits the preamble to the base station apparatus are periodically allocated, based on the random access resource information.

* * * * *